(12) United States Patent
Bieler

(10) Patent No.: US 12,097,676 B2
(45) Date of Patent: Sep. 24, 2024

(54) CORE ELEMENT FOR SANDWICH ELEMENTS, USE OF SUCH A CORE ELEMENT, AND METHOD FOR PRODUCING SUCH A CORE ELEMENT

(71) Applicant: Thomas Bieler, Ohne (DE)

(72) Inventor: Thomas Bieler, Ohne (DE)

(73) Assignee: Thomas Bieler, Ohne (DE)

( * ) Notice: Subject to any disclaimer, the term of this patent is extended or adjusted under 35 U.S.C. 154(b) by 136 days.

(21) Appl. No.: 17/421,113

(22) PCT Filed: Jan. 27, 2020

(86) PCT No.: PCT/EP2020/051951
§ 371 (c)(1),
(2) Date: Jul. 7, 2021

(87) PCT Pub. No.: WO2020/160953
PCT Pub. Date: Aug. 13, 2020

(65) Prior Publication Data
US 2022/0152959 A1    May 19, 2022

(30) Foreign Application Priority Data
Feb. 6, 2019 (DE) ...................... 10 2019 201 527.1

(51) Int. Cl.
*B29D 24/00*    (2006.01)
*B32B 3/06*    (2006.01)
(Continued)

(52) U.S. Cl.
CPC .............. *B29D 24/008* (2013.01); *B32B 3/06* (2013.01); *B32B 3/28* (2013.01); *B32B 3/30* (2013.01);
(Continued)

(58) Field of Classification Search
CPC .... B32B 3/06; B32B 3/28; B32B 3/30; B32B 3/26; B32B 3/266; E04C 2/324;
(Continued)

(56) References Cited

U.S. PATENT DOCUMENTS 5,894,045 A * 4/1999 Desrondiers .............. B32B 3/12
52/793.1
8,402,715 B2    3/2013 Uhllg et al.
(Continued)

FOREIGN PATENT DOCUMENTS

DE    10 2004 062264 A1    7/2006
EP    2 608 903 B1    4/2017
(Continued)

OTHER PUBLICATIONS

International Search Report in PCT/EP2020/051951, mailed May 15, 2020.

*Primary Examiner* — Catherine A. Simone
(74) *Attorney, Agent, or Firm* — Collard & Roe, P.C.

(57) ABSTRACT

Core element for sandwich elements, wherein the core element has at least two hemisphere panels which are combined with one another, wherein each hemisphere panel has, between planar portions, and spaced apart from one another, uniform hemispherical elevations, wherein the two or in each case two hemisphere panels face one another by way of their elevations, wherein, with two or in each case two hemisphere panels combined with one another, the elevations of one hemisphere panel each bear with their apexes or apex surfaces against a planar portion of the other hemisphere panel, and wherein two hemisphere panels are connected to one another by virtue of the elevations being connected, in the region of their apexes or apex surfaces, to the planar portion of the other or another hemisphere panel against which they bear. Moreover, the invention also relates to the use of a core element and to a method for producing a core element.

11 Claims, 16 Drawing Sheets

(51) Int. Cl.
  *B32B 3/28* (2006.01)
  *B32B 3/30* (2006.01)
  *E04C 2/32* (2006.01)
  *E04C 2/34* (2006.01)
  *F24S 20/66* (2018.01)

(52) U.S. Cl.
  CPC ............ *E04C 2/324* (2013.01); *E04C 2/3405* (2013.01); *F24S 20/66* (2018.05); *E04C 2002/3411* (2013.01)

(58) Field of Classification Search
  CPC ........... E04C 2/3405; E04C 2002/3411; E04C 2002/3433; E04C 2002/3427; E04C 2002/3416; F24S 20/66
  USPC ...................... 428/72, 73, 178, 131; 52/789.1
  See application file for complete search history.

(56) References Cited

U.S. PATENT DOCUMENTS

| | | | | |
|---|---|---|---|---|
| 8,915,339 | B2* | 12/2014 | Kanous .................... | E04F 15/18 |
| | | | | 52/789.1 |
| 2006/0177635 | A1* | 8/2006 | Pepe ........................ | B32B 27/00 |
| | | | | 428/174 |
| 2007/0251170 | A1* | 11/2007 | Uhlig .................... | E04C 2/3405 |
| | | | | 52/309.16 |

FOREIGN PATENT DOCUMENTS

| | | | | |
|---|---|---|---|---|
| GB | 2426739 A | * | 12/2006 | ............ B29C 65/02 |
| KR | 100734182 B1 | | 7/2007 | |
| WO | 2008/128235 A1 | | 10/2008 | |

* cited by examiner

CORE ELEMENT FOR SANDWICH ELEMENTS, USE OF SUCH A CORE ELEMENT, AND METHOD FOR PRODUCING SUCH A CORE ELEMENT

CROSS REFERENCE TO RELATED APPLICATIONS

This application is the National Stage of PCT/EP2020/051951 filed on Jan. 27, 2020, which claims priority under 35 U.S.C. § 119 of German Application No. 10 2019 201 527.1 filed on Feb. 6, 2019, the disclosure of which is incorporated by reference. The international application under PCT article 21(2) was not published in English.

BACKGROUND OF THE INVENTION

1. Field of the Invention

The invention relates to a core element for sandwich elements or sandwich components. Sandwich elements are principally known. These are produced using sandwich construction methods. This involves applying an extension stiff cover layer as an outer cover layer on both sides of an at least moderately shear stiff core.

2. Description of the Related Art

On known sandwich elements, the core is made of solid material (polyethylene, balsa wood), foam (hard foam, metal foam), insulating material (hard foam, mineral wool), or in the form of a honeycomb lattice (paper, cardboard, metal, plastic). The core transfers exerted shear forces and supports the cover layers. Sheetmetal, plastic, (ply-) wood, or composite fiber materials are regularly used as cover layers.

SUMMARY OF THE INVENTION

The object of the invention is to specify a further core element for sandwich elements.

This object is solved according to the invention by a core element with the features of Claim 1. The core element is conceivable as a core element for sandwich elements and sandwich components, but can also be used by itself. The central aspect of the innovation proposed here is a component referred to hereinafter as a hemisphere panel. The core element comprises at least two hemisphere panels, that is to say for example exactly two hemisphere panels, or three, four, or more hemisphere panels. Each hemisphere panel is a panel into which uniform elevations are molded. The outer surfaces of the elevations are at least sectionally shaped as a hemisphere, as a sphere segment, or as a sphere layer. Disregarding elevations along the perimeter, the elevations are surrounded by planar regions of the hemisphere panel. Each hemisphere panel has a plurality of elevations. These elevations all have the same shape (uniform elevations). But this does not rule out that a hemisphere panel has further elevations in addition to the uniform elevations, for example between the uniform elevations and between individual uniform elevations. All elevations of a hemisphere panel only have the same shape in a special optional embodiment.

In the interest of better clarity of the further specification, the geometry of the exterior surface of elevations of the hemisphere panel—also and specifically in reference to the term "hemisphere panel" (which is likewise not be interpreted restrictively)—is referred to as a hemisphere or hemispherical.

In the specification presented here, the term "hemisphere" or derived terms reach above and beyond the reach of the geometric definition (cross-section of a full sphere with a cross-section plane that comprises the sphere centerpoint). In the specification presented here, the term "hemisphere" comprises a true hemisphere, a sphere segment, and a sphere layer. A hemisphere and a sphere segment have a point-shaped apex (apex). A sphere layer has a planar apex (apex surface) in place of a point-shaped apex.

A sphere segment is known as a section of a full sphere that results based on a cross-section through a full sphere with exactly one (basically arbitrary) cross-section plane. A hemisphere is known as a special form of a sphere segment. A sphere layer is known as a section of a full sphere that results from a cross-section of a full sphere with exactly two parallel and otherwise principally arbitrary cross-section planes. For the innovation proposed here, a sphere segment, but preferably a sphere segment of a principally optional type, is one on which the cross-section plane and the upper apex of the spherical body are located on the same side of the centerpoint of the full sphere (hemisphere segment). For the innovation proposed here, a sphere layer, but preferably a sphere layer in a principally optional manner, is one on which the two parallel cross-section planes are located on the same side of the centerpoint of the full sphere (hemisphere layer).

We note that the term "hemisphere" in the reach defined above does not necessarily refer to a full body as the specification refers to the exterior surface of the elevations. The outer surface is in this case deemed to be the surface having the largest surface area; the outer surface of an elevation is the particular surface that is at least sectionally convex. The elevations are preferably hollow, and the geometry of such elevations would accordingly have to be accurately referred to as hemisphere shells, in which case the term hemisphere shell—according to the discussion above comprises the terms hemisphere shell, sphere segment shell, and sphere layer shell.

The unique feature and therefore one of the principal advantages of the innovation proposed here—that is to say that of the core element proposed here—consists of a particularly high compressive stability. This compressive stability is the product of the shape of the elevations.

It is in this case not or not significantly of importance whether the exterior surfaces of the elevations have the shape of a true hemisphere, the shape of a sphere segment, of a hemisphere segment, of a sphere layer, or of a hemisphere layer. This is why the definition of the term "hemisphere" as explained above was introduced, which applies likewise also for derived terms, such as hemispherical and the like. Any mention of a hemisphere or a hemispherical shape shall therefore also always include the other shapes (sphere segment, hemisphere segment, sphere layer, hemisphere layer), and said shapes are elements of the present invention as possible shapes of elevations in a hemisphere panel.

It is further not or not significantly of importance for compressive stability whether a hemispherical elevation (in the reach defined above) is truly circular in its base and/or in the region of any apex surface, or elliptical (if applicable), since an ellipse is known as a circle that is compressed or elongated in one coordinate direction. The reach defined above for the term "hemisphere" therefore also includes the geometries resulting on the basis of an ellipsoid: semi-ellipsoid, ellipsoid segment, semi-ellipsoid segment, ellipsoid layer, semi-ellipsoid layer. The shapes are also elements of the present invention as possible shapes of the elevations of hemisphere panel. This is a product of the circumstance that an exact hemisphere is certainly not unproblematic in terms of production technology, and because even after a hemisphere is produced using a mold with exactly hemispherical mold elements, an originally hemispherical elevation can be distorted for example due to more pronounced shrinkage in one spatial direction and/or elongation and/or compression, for example while transporting during the manufacturing process.

All cited geometries (hemisphere, sphere segment, hemisphere segment, sphere layer, hemisphere layer, semi-ellipsoid, ellipsoid segment, semi-ellipsoid segment, ellipsoid layer, semi ellipsoid layer) comprise a region in the shape of an ellipsoid layer, where applicable in a special shape of a sphere layer or as a hemisphere layer. In regards to the innovation proposed here, any elevation of a hemisphere panel then comprises at least one region in the shape of an ellipsoid layer; in other words: every elevation has at least sectionally the shape of an ellipsoid layer. A more general definition of the elevations defined in the present claims as "hemispherical, sphere segment-shaped, or sphere layer-shaped" then is that the elevations comprise at least one region in the shape of an ellipsoid layer.

In regards to the embodiments of the core element, it is finally also not or at least not of decisive importance whether a hemispherical elevation (in the reach defined above) for example has an annular region as its base. The definition of the hemisphere panel therefore specifies that the outer surfaces of the elevations are at least sectionally shaped as a hemisphere, as a sphere segment, or as sphere layer. In the case of a for example annular base, the elevation comprises a annular region originating from the planar region of the panel that transitions into the hemispherical elevation (in the reach defined above). Other geometries of a base (between the panel and elevation) are likewise conceivable, such as a polygonal base.

A core element is obtained by two or in each case two hemisphere panels with such elevations facing each other with their elevations. When exactly two or in each case two hemisphere panels are combined into a core element, the elevations of one hemisphere panel make contact with their free upper sides to a planar region of the other hemisphere panel, that is to say between the elevations of the other hemisphere panel. This applies likewise for the other hemisphere panel. The upper sides of the elevations contacting the respectively other hemisphere panel result in a plurality of point-shaped or circular contact points between the hemisphere panels. These contact points direct the forces acting on the surface of a hemisphere panel into the respectively contacting hemispherical elevation and further into the planar surface of the other hemisphere panel. This results in the high compressive stability of the core element proposed here.

Preferably, but principally optionally, the elevations are periodically spaced from each other over the entire surface area of the hemisphere panel, and are then arranged in a matrix over the entire surface area of the hemisphere panel. The array created by the matrix arrangement is called elevation array. Preferably, but principally optionally, both or respectively two hemisphere panels are equivalent at least in reference to the elevation array.

A suitable detachable or not-detachable connection between at least two hemisphere panels, that is to say a connection between the free upper sides (apex points or apex surfaces) of the elevations with the planar region to which they make contact generates the high load capacity and stiffness principally known from known sandwich elements. The planar regions of the hemisphere panels then act like the cover layers required on previously known sandwich elements.

In addition to the already mentioned particularly high compressive stability resulting primarily based on the hemispherical elevations, one of the central advantages of the innovation proposed here, that is to say the core element proposed here, is that the core element can be produced with relative ease. Each of the at least two hemisphere panels comprising the core element can for example be produced by means of pressing methods, by deep drawing, or the like. After at least two hemisphere panels are produced, where appropriate also sequentially on the same machine, the two hemisphere panels can be combined with each other in the manner described above, after which the core element is then already produced. Additional cover layers—as are required on previously known sandwich elements—are not required, but are certainly optionally possible.

Yet another decisive advantage of the innovation proposed here is that the core elements are not limited to a planar shape and can have curvatures. A possible bending radius is then substantially only limited by the distance of the elevations in relation to each other, in particular the elevation array, in the direction of the intended curvature. Whereas for a planar core element, the elevations of a hemisphere panel typically come to rest centrally between adjacent elevations of the respective other hemisphere panel, a position displaced from the central position results for a curvature.

Yet another advantage of the innovation proposed here is that a single core element, that is to say a combination of at least two hemisphere panels, is deformable in total, for example by heating and/or deep drawing. The resulting deformations are formed as elongations or compressions of the elevations and/or the planar regions between the elevations. The aforementioned special compressive stiffness and stability of the core element is as a result reduced only marginally, if at all. Such deformations allow even more complex geometries to be created than would be possible by curvatures along respectively one spatial axis. Using such deformations, core elements can for example be created that can be used directly—or following a coating or attachment of at least one cover layer or the like—as body components on vehicles, parts of an interior lining of vehicles, and the like.

Advantageous embodiments of the invention are the subject-matter of dependent claims. Any references used in this case within the claims refer to the further embodiments of the subject matter of the referenced claim by the features of the respectively dependent claim. They are not to be understood as a waiver of achieving independent subject matter protection for the features or feature combinations of a dependent claim. Furthermore, with regard to an interpretation of the claims and the specification, the assumption must be made when a feature in a dependent claim is described in greater detail that such a restriction does not apply in the respectively preceding claims and in a more general embodiment of the core element in the present specification or in a method for producing such a core element. Any reference in the specification to aspects of dependent claims is then without special reference also to be expressly understood as a specification of optional features. And finally, we note that the core element specified here can also be enhanced according to the dependent method claims, for example in that the core element exhibits features resulting from a method step, and vice-versa, that is to say in that the method for producing a core element is enhanced by method steps that are intended and suited to obtain a subject matter feature of the core element.

For an embodiment of the core element, two hemisphere panels or in each case two hemisphere panels are connected to each other in that the elevations in the region of their apex points or apex surfaces are connected with the planar region of the other or another hemisphere panel to which they make contact. Such a connection between two or in each case two hemisphere panels can be readily accomplished with production technical means and ensures a mechanically sufficiently strong and continuously load-bearing connection. The connection can be made by gluing, welding, melting, and so on. The connection can be optionally made directly after the hemisphere panels are produced, for example in that two hemisphere panels exit from a so-called calender, a roller mill, or the like with the elevations facing each other, the elevations then having an adhesive applied in the region of their apex points or apex surfaces, and the two hemisphere panels then proceeding through a further press method (in-line press, double-conveyor press) that joins the two hemisphere panels together and brings the apex points or apex surfaces of the elevations of each hemisphere panel in contact with the planar region of the respectively other hemisphere panel using the adhesive applied there, and presses both onto each other.

For a special, advantageous embodiment of the core element, the elevations respectively arranged in a same elevation array have radially outward facing dimples in the region of their apex points or apex surfaces, and each hemisphere panel has openings in the area of its planar regions and in the elevation array to accommodate respectively one dimple. For two or in each case two hemisphere panels combined with each other, the dimples of one hemisphere panel engage with a shape lock into the openings of the respectively other hemisphere panel. The primary advantage of this embodiment is that the engagement of the dimples into the openings ensures an at least initial adjustment of the hemisphere panels relative to each other, and—given a shape locked accommodation of the dimples in the openings—also regularly already provides a certainly load-bearing combination of two hemisphere panels. A core element with such hemisphere panels can likewise be produced in the manner described above. In this case too, for example two hemisphere panels exit a machine known as a calender in engineering terminology, or the like, and are then combined with each other using a further press that joins the two hemisphere panels and engages the dimples into the openings. Prior to combining the two hemisphere panels using the further press, adhesive can be applied to the apex points or apex surfaces of the elevations and/or the dimples. This too can be seamlessly integrated into the production process. Additionally or alternatively to gluing, hemisphere panels can also be connected to each other by welding or melting the dimples in the openings.

The dimples accommodated by the openings ensure a particularly high load capacity and stiffness of the core element based on the one-piece connection to the adjacent hemispherical elevations, as the dimples accommodated by the opening prevent the dimples and the adjacent elevation from being shifted relative to the plane with the openings. This is a major advantage compared to a combination of two hemisphere panels for example achieved by gluing, as such a shift is nevertheless possible under certain circumstances when adhesive is used due to the elasticity of the adhesive, thus permitting a deflection.

In yet another advantageous embodiment of the core element, the two hemisphere panels of the core element or at least two hemisphere panels of the core element are connected to each other on two perimeter sides, in particular along two opposing perimeter sides, and a liquid or gaseous medium can flow through the two hemisphere panels connected to each other on two perimeter sides from one of the remaining perimeter sides to the other remaining perimeter side. The core element can then be used for applications such as heating, cooling, and energy generation (sun collector). Irrespective thereof, such a core element can also act as a segment in a line system (water supply, ventilation, and the like), and in this case fully or at least sectionally replaces conventional pipes, in particular water pipes, ducts, in particular ventilation ducts, or the like. Alternatively or additionally, such a core element accommodates electrical cables, signal cables, communication cables, or the like, or comprises sections of such cables contacting along the perimeter.

Additionally or alternatively to an embodiment with at least two or respectively two hemisphere panels connected along the perimeter, a special embodiment of the core element is one where the core element accommodates lines between both hemisphere panels or between at least two hemisphere panels, said lines embedded in one spatial direction by the planar regions of the hemisphere panels and in a spatial direction vertical thereto by the elevations of the hemisphere panels. Such lines can for example be lines for a liquid or gaseous medium. In such a configuration, the core elements can also be used for applications such as heating, cooling, and energy generation (sun collector). Likewise, as described above, such a core element is also (additionally or alternatively) conceivable as a segment in a line system (water supply, ventilation, and the like). On such a core element, an accommodation is also additionally or alternatively arranged for electricity cables, signal cables, communication cables, or the like, or an embodiment with regions where such lines can be contacted on the perimeter is arranged.

When the two embodiments of the core element that accommodate a volumetric flow are combined (closed on two perimeter sides; lines in the interior of the core element), such an embodiment can for example also be used as a heat exchanger. When such a core element is used, a heat transfer occurs in the principally known manner between the surfaces of the lines in the interior of the core element and the medium also flowing in the interior of the core element. Depending on the application situation, such a core element can be used for heating or cooling.

The invention then also specifies a use of a core element—as shown here and below—as a sun collector, that is to say as a panel heating or panel cooling system, or as a heat exchanger.

In yet another advantageous embodiment of the core element, a free space between two hemisphere panels facing each and between the elevations comprised by these is filled with an insulating material, such as PUR foam or the like. Such a material in the cavity enclosed by the two hemisphere panels facing each other yet again increases the compressive strength of the core element. The insulating material also results in outstanding thermal and/or acoustic insulation between regions on different sides of the core element, for example between spaces segregated by the core element or several core elements of the same type, when the core element acts, or the core elements act as an interior wall, or between an inner space and the environment when the core element or several core elements of the same type act as an outer wall.

The claims submitted together with the application are proposed formulations without prejudice for achieving further patent protection. Since in particular the features of the dependent claims can represent their own and independent inventions in regards to the prior art on the priority date, the applicant reserves the right to make these or other feature combinations until now only disclosed in the specification and/or the drawing the subject—matter of independent claims or declarations of division. They can of course furthermore also contain independent inventions that can have an embodiment independent from the subject matter of the respectively referenced claims.

The following is a detailed discussion of an exemplary embodiment of the invention based on the drawing. Subject matter or elements that correspond to each other are shown in all drawings with the same reference symbol. However not all subject matter items are individually labeled for equivalent subject matter items.

The one, or any, exemplary embodiment is not to be understood as a restriction of the invention. For the purposes of the present disclosure, amendments and modification are instead possible, in particular those that a person skilled in the art can derive in regards to the solution of the task, for example by combining or varying individual features or method steps described in connection with the general or special specification section and those in the claims and/or drawings, and that can result in a new subject matter or in new method steps and/or method step sequences by combinable features.

DETAILED DESCRIPTION OF PREFERRED EMBODIMENTS

Figure 1:
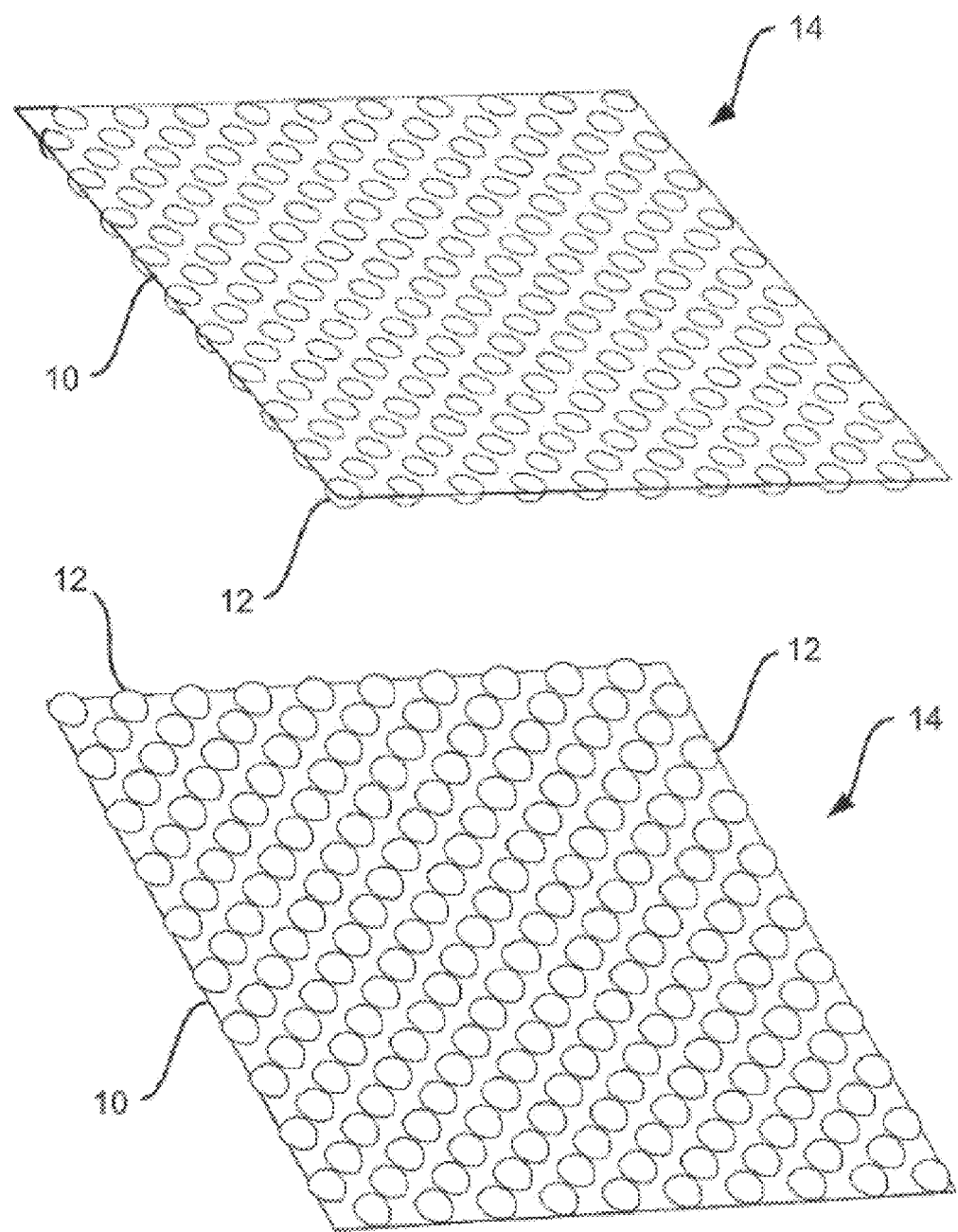
FIG. 1 a panel into which hemispherical elevations are molded (hemisphere panel) in two isometric views, FIG. 2 a core element formed from two hemisphere panels, in particular for sandwich elements, in an isometric view, FIG. 3 the core element from FIG. 2 in further views, FIG. 4 the core element from FIG. 2 with a cover layer, FIG. 5 the core element from FIG. 2 with respectively one cover layer on both sides as seen from different vantage points, FIG. 6 a special embodiment of a core element with dimples on an apex point of the elevations, FIG. 7 the core element from FIG. 6 with respectively one cover layer on both sides as seen from different vantage points FIG. 8 different arrangements of elevations over the full surface area of respectively one hemisphere panel, FIG. 9 a multi-layer core element, wherein each layer corresponds to one core element according to FIG. 3 or FIG. 6, FIG. 10 a further embodiment of a multi-layer core element, FIG. 11 a core element with lines embedded between two hemisphere panels, FIG. 12 a core element through which a medium flows or a core element filled with an insulating material, FIG. 13 to FIG. 16 variants of the elevations, FIG. 17 and FIG. 18 variants of the arrangement of the elevations, and FIG. 19 filled elevations.

FIG. 1 shows two panels 10 having a plurality of hemispherical elevations 12 shown for the embodiment. Disregarding elevations 12 along the perimeter, the elevations 12 are surrounded on all sides by planar regions of the respective panel 10.

Reference is made to the discussion and definitions in the general specification section regarding the geometry of the elevations 12. When the elevation 12 is labeled as hemispherical, this expressly does not mean a restriction to the geometric shape of a hemisphere. A hemisphere is instead only one of many possibilities. Other possible geometries are in particular geometries having the shape of a sphere segment, a hemisphere segment, a sphere layer, hemisphere layer, and those geometries based on an ellipsoid in place of a sphere. Without reference to such geometries, any one elevation 12 can also be defined in that it has an elliptical, in particular circular base, an at least sectionally convex outer surface, and an upper apex point, and in place of an apex point, has an apex surface with an elliptical, in particular circular, perimeter.

Any further mention of an elevation 12 in the specification to follow at all times implies including the aforementioned geometries and/or the above definition that omits reference to such geometries.

The elevations 12 are for example molded into an originally planar panel 10 by deep drawing. The panel 10 can alternatively also be formed with all elevations 12 in a production process, in particular along a production line.

The panel 10 together with the elevations 12 comprised by the panel 10 as a single piece (only individual elevations 12 shown) is hereinafter called a hemisphere panel 14. Here too, the specification at all times implies that the geometry of the elevations 12 of a component referred to as a hemisphere panel 14 is expressly not limited to an exact hemispherical shape. Irrespective of what exact geometry the respective elevations 12 have, it is always implied that the elevations 12 of a component referred to as a hemisphere panel 14 have the same height and the same shape, or least within the framework of typical manufacturing tolerances have the same height and the same shape; every hemisphere panel 14 has uniform elevations 12.

For the hemisphere panels 14 shown in FIG. 1 and in the Figures to follow, it is implied that these always show hemisphere panels 14 with the elevations 12 in focus for the innovation proposed here, wherein the hemisphere panels 14 only have such elevations 12. All elevations on such hemisphere panels 14 are equivalent, namely equivalent within the framework of typical manufacturing tolerances. Any embodiments shown of hemisphere panels 14 with equivalent elevations do not rule out that hemisphere panels 14 have other humps or bulges, or the like, in a special embodiment in addition to the equivalent (uniform) elevations 12.

For a hemisphere panel 14 with true hemispherical elevations 12, these elevations 12 all have the same radius and therefore also the same height. The radius of a hemispherical elevation 12 determines the respective diameter of its circular base surface area. Elevations 12 with consistently equivalent radius and consistently equivalent circular base surface area and consistently equivalent curvature radius have consistently uniform (equivalently-shaped) elevations 12. This applies likewise for all other shapes of the elevations 12.

These uniform elevations 12 are spaced at a distance from each other and—for the embodiment shown—are in a principally optional manner distributed over the surface area of the hemisphere panel 14 in a uniform matrix array. The uniform array (elevation array) is characterized in that an imagined connecting line between an elevation 12 and an adjacent further elevation 12 (for example a connecting line between the apex points of these elevations 12 or a connecting line between the centers of the apex surfaces of these elevations 12) results in a distance between these elevations 12 that is regularly repeated as one progresses along the connecting line (array dimension). Different connection lines and therefore different directions of connecting lines are conceivable with the elevation array. The regularly repeating distance is implied along all such connecting lines, wherein parallel connecting lines have equivalent distances between respectively two elevations 12, and non-parallel connecting lines can also result in differences between the distances between respectively two elevations 12 along a first connecting line and along a second connecting line not parallel thereto.

The following are examples of materials conceivable as materials for a hemisphere panel 14: plastics such as PP, PE, PS, PVC, PMMA, PC, PET, and bio-polymers, composites such as carbon-fiber composites, fiberglass composites, Litecor, metal composites, and composite-coated sheet-metal, paper, casting materials such as resins, concrete, gypsum, and metal, and metals such as steel, titanium, aluminum, copper, brass, etc. Foam materials such as XPS foam, PE foam, PET foam, PUR foam, etc. can also be used for special applications.

The representation in FIG. 1 shows isometric views of the hemisphere panels 14. The hemisphere panel 14 shown in the bottom region of FIG. 1 is shown in an orientation wherein the vantage point shows a respectively visible part of the convex surfaces (outer surface) of the elevations 12 comprised by the hemisphere panel 14. The hemisphere panel 14 shown in the upper region of FIG. 1 is shown in an orientation wherein the vantage point shows a respectively visible part of the concave surfaces (inner surface) of the elevations 12 comprised by the hemisphere panel 14.

We already note here that the shown arrangement of the elevations 12 relative to each other on the surface of the panel 10 is strictly an exemplary arrangement. Other arrangements are likewise conceivable and at least individual particularly preferred arrangements will be shown below.

Figure 2:
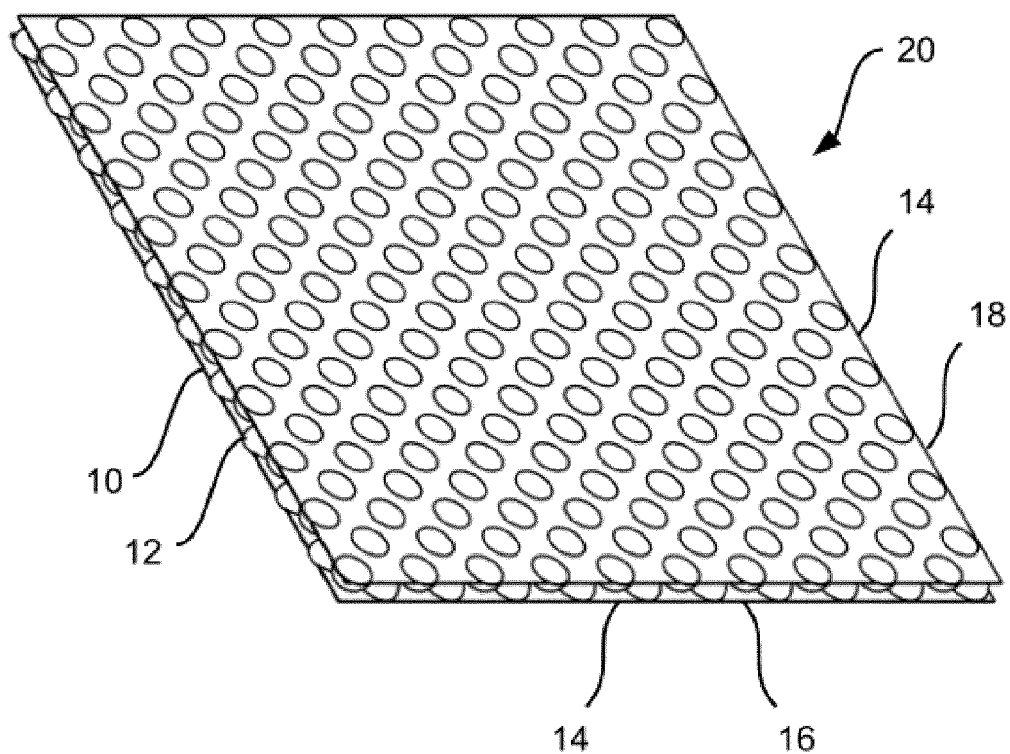

For purposes of differentiation, the hemisphere panels 14 shown in the representation in FIG. 2 are labeled with further reference symbols: first hemisphere panel 16; second hemisphere panel 18. The geometries and the number and arrangement of the elevations 12 are identical on the first and second hemisphere panel 16, 18, that is to say identical in that they originate from the same production process, that is to say for example from the same mold or from equivalent molds, or represent sections of hemisphere panels 14 that for example originate from the same mold or from the same molds.

Exactly one hemisphere panel 14; 16, 18 forms a part of the core element 20 proposed here and is hereinafter referred to as core or core element for sandwich elements. Exactly one first hemisphere panel 16 and exactly one second hemisphere panel 18 together form a simple embodiment of a core element 20 for sandwich elements proposed here. When a first hemisphere panel 16 and a second hemisphere panel 18 are combined, the two hemisphere panels 16, 18 face each other with the outer surfaces of their elevations 12. When a first hemisphere panel 16 is combined with a second hemisphere panel 18, every elevation 12 of the first hemisphere panel 16 is positioned in a free space between adjacent elevations 12 of the second hemisphere panel 18. Likewise, every elevation 12 of the second hemisphere panel 18 combined with the first hemisphere panel 16 is positioned in a free space between adjacent elevations 12 of the first hemisphere panel 16. The apex point or apex surface of every elevation 12 of one of the hemisphere panels 16, 18 contacts a planar region of the panel 10 of the respectively other hemisphere panel 16, 18. At that contact location, a point-shaped or substantially point-shaped contact location 22 is created for an apex point, and a circular contact point 22 is created for an apex surface. The two hemisphere panels 16, 18 are connected to each at these contact locations 22 (FIG. 3) and only at these contact locations 22 (disregarding an optional perimeter seal discussed below), for example by gluing. Other possible connection methods for example include welding, threading, sowing, riveting, pressing, and clamping.

Figure 3:
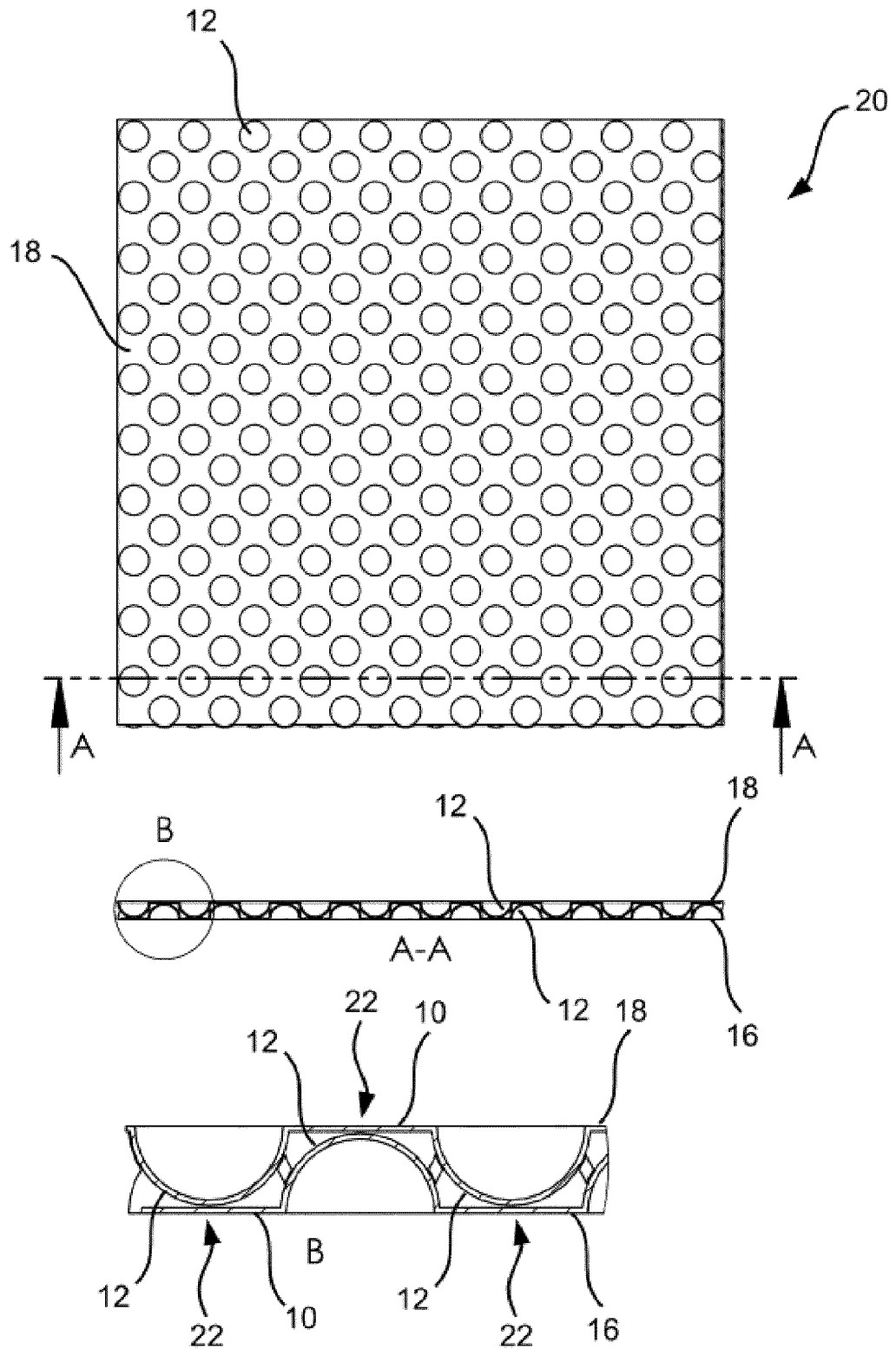

In order to show this arrangement of the elevations 12 relative to each other of two hemisphere panels 14; 16, 18 combined to a core element 20, FIG. 3 (top) shows a top view of a core element 20 formed by two hemisphere panels 14; 16, 18, (center) a lengthwise cross-section through the core element 20 and (bottom) an enlarged section from the lengthwise cross-section.

The top region of FIG. 3 shows a top view onto a core element 20 formed by two hemisphere panels 14; 16, 18. Only one of the hemisphere panels 14 is visible in the top view, namely the second hemisphere panel 18, which is hereinafter strictly for linguistic differentiation and without limiting a later orientation/installed orientation also referred to as the upper hemisphere panel 18. The elevations of the visible/upper hemisphere panel 18 appear as circles in this representation. All circles have the same diameter. The vantage point onto the plane of the upper hemisphere panel 18 shows the inner surfaces of the elevations 12. In the interest of clarity of the representation, only one of the elevations 12 is labeled in the top region of FIG. 3. When looking onto the visible/upper hemisphere panel 18, the elevations 12 comprised thereby can principally also be called and regarded as indentations.

In its center region, the representation in FIG. 3 shows a lengthwise cross-section through the core element 20 along the cross-section plane A-A. In its bottom region, the representation in FIG. 3 shows an enlargement of the section labeled "B" from the lengthwise cross-section along the cross-section plane A-A.

The two cross-section representations—in particular their enlargements—clearly show that every elevation 12 of the first hemisphere panel 16 is positioned in a free space between adjacent elevations 12 of the second hemisphere panel 18. The enlarged representation in the bottom region of FIG. 3 shows the only completely shown elevation 12 of the first hemisphere panel 18—likewise strictly for linguistic differentiation and without restriction for a later orientation/installed orientation, hereinafter called the lower hemisphere panel 16—positioned between two laterally contacting elevations 12. Yet another elevation 12 of the upper hemisphere panel 18 is visible behind (from a vantage point into the drawing plane) the only completely shown elevation 12 of the bottom hemisphere panel 16.

The latter likewise makes lateral contact in the plane of the core element 20 to the only elevation 12 of the bottom hemisphere panel 16 shown completely in the enlargement. The same applies likewise for a further not shown elevation 12 of the upper hemisphere panel located in front of the cross-section plane. The only elevation 12 shown completely in FIG. 3 is therefore fully positioned in a free space between adjacent elevations 12 of the upper hemisphere panel 18. This applies likewise for all elevations 12 of the bottom hemisphere panel 16. For elevations 12 along the perimeter (along the perimeter of the hemisphere panel 16; along the perimeter of the core element 20), an elevation 12 of the bottom hemisphere panel 16 may be enclosed by a lower number of elevations 12 of the upper hemisphere panel 18 than is the case for an elevation 12 located in the surface area of the core element 20.

What is stated above for the elevations 12 of the bottom hemisphere panel 16 applies likewise for the elevations 12 on the upper hemisphere panel 18.

In the configuration shown in FIG. 3, the only completely shown elevation 12 of the bottom hemisphere panel 16 is positioned between respectively one elevation 12 adjacent to the right and one elevation 12 adjacent to the left of the upper hemisphere panel 18, and between respectively one elevation 12 adjacent to the front and one elevation 12 adjacent to the back of the upper hemisphere panel 18. This also applies likewise for all other elevations 12 of the bottom hemisphere panel 16 (taking into account any differences along the perimeter). For the shown embodiment, this also applies likewise for all elevations 12 of the upper hemisphere panel 18.

When the two hemisphere panels 16, 18 are combined, the apex point or apex surface of every elevation 12, that is to say every elevation 12 of the bottom hemisphere panel 16 and every elevation 12 of the upper hemisphere panel 18, makes contact to a planar region of the panel 10 enclosed by other elevations 12 of the respectively other hemisphere panel 16, 18, and respectively point-shaped or substantially point-shaped contact locations 22 or circular contact locations 22 are created there. The effective size (thickness, height) of the core element 20 is determined by the contact of the elevations 12 at their apex point or their apex surface to the (then inner) surface of a planar region of the panel 10 of the respectively other hemisphere panel 16, 18. A height of the elevations 12 determines the size of the core element 20. The actual size is determined as the sum of the radius and/or the height of the elevations 12 plus the size of the panels 10 of the two hemisphere panels 16, 18.

For purposes of combining the two hemisphere panels 16, 18 to obtain a core element 20, the two hemisphere panels 16, 18 are connected at these contact locations 22, for example by gluing. The contact locations 22 are labeled in the enlarged section of the cross-section rendering. We note in this regard that the reference arrows strictly point to, and do not directly label, the contact locations 22. The contact locations 22 are located between the opposing surfaces of the hemisphere panels 16, 18 at the locations indicated by the arrows.

A plurality of such contact locations 22 are created along the plane of a core element 20. Every contact location 22 is also a force introduction location for force transfer from one hemisphere panel 16, 18 to the other hemisphere panel 16, 18. The geometry of each elevation 12 (hemispherical, in the shape of a sphere segment or a sphere layer, etc.) ensures a particularly high strength, in particular compressive strength, of the core element 20 formed from two hemisphere panels 16, 18. Given a force exerted onto the core element 20 from a direction of a vector perpendicular to one of the major surfaces of the core element 20, every elevation 12 distributes the exerted forces starting from the contact location 22 along the circumferential line of the elevation 12 and directs the exerted forces into the panel 10 forming a single part with the elevation 12.

A special advantage of the core element 20 proposed here is that the latter is already stable without additional outer cover layers. Cover layers 24 can nevertheless by applied on one or both sides of the major surfaces of the core element 20, as shown in the example represented in FIG. 4, that is to say for example connected in the principally known manner by gluing or detachably or non-detachably connected by other suitable means to an outward facing surface of the core element. Because the core element 20 is already stable by itself, that is to say without at least one outer cover layer, there is no need for a special axial rigidity of the one or any cover layer 24. The one or any cover layer 24 applied onto the core element proposed here can therefore be fully or partially selected based on considerations other than the stability of a sandwich element formed with the core element 20. The choice can for example be fully or partially based on visual and/or haptic properties of a cover layer 24. Criteria such as thermal insulation, fire protection/fire suppression, acoustic insulation and the like can likewise be taken into consideration. Irrespective of everything stated above, an overall stability of the sandwich element formed with the core element 20 proposed here can of course also be increased by applying at least one corresponding cover layer 24.

Figure 5:
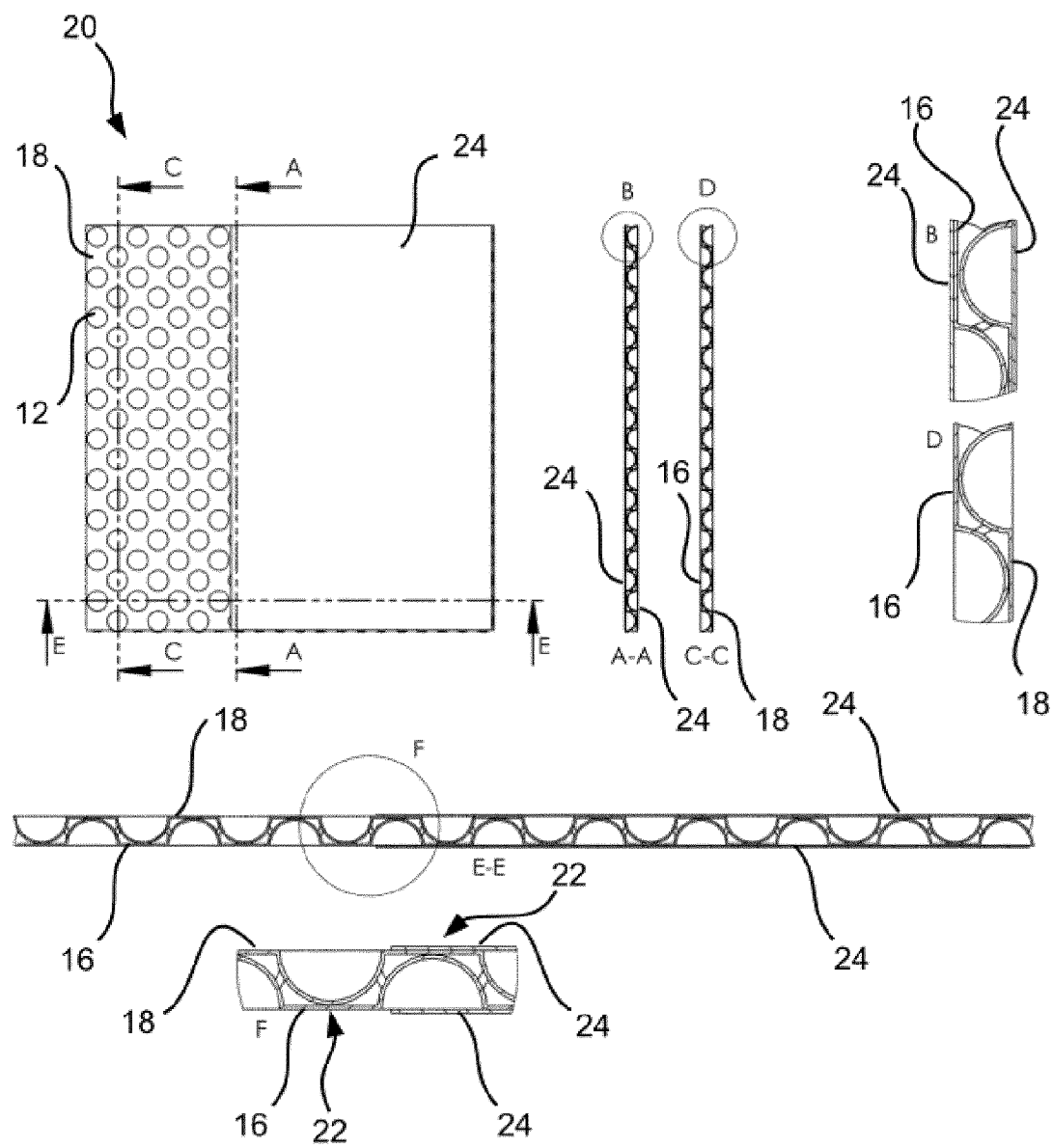

Using similar views and similar cross-sections as those shown in FIG. 3, the representation in FIG. 5 shows an embodiment of the core element 20 proposed here with cover layers 24 applied on both sides. Here, strictly for illustration, the cover layers 24 in this case extend only over a part of the shown surface area of the core element 20. Such cover layers 24 are typically applied over the entire surface area or at least substantially over the entire surface area of the core element 20.

Firstly from left to right, the representation in FIG. 5 shows a top view onto a core element 20 according to FIG. 3, wherein a cover layer 24 is applied to a part of the visible surface area of the core element 20. A cover layer 24 is likewise applied on the not visibly surface area of the core element 20. To the right of the representation of the core element 20, two lengthwise cross-sections are shown in a top view through the core element 20 along the cross-section lines A-A and C-C. The cross-section line A-A is located in the region of the applied cover layers 24. The cross-section line C-C is located in the region outside of the applied cover layers 24. The cross-section along these cross-section lines therefore corresponds to the corresponding representation in FIG. 3. In the interest of clarity of the representation, only each of the outer layers labelled in the cross-section representations, that is to say firstly the cover layers 24 and secondly the bottom hemisphere panel 16 and the upper hemisphere panel 18. Sectional enlargements of the regions labeled "B" and "D" are shown in the cross-sections on the far right in FIG. 5. The enlargement from the region labeled "D" corresponds to the representation in FIG. 3. The enlargement of the region labeled "B" shows how the cover layers 24 lie on the planar region of the panels 10 of the hemisphere panels 16, 18, that is to say flat and in a plane parallel to the plane of the panels 10.

Below the already discussed regions of the representation in FIG. 5, the latter shows a lengthwise cross-section through the core element 20 with applied cover layers 24 in the region of the cross-section line E-E. This cross-section line intersects the cross-section lines A-A and C-C, and the cross-section therefore captures a region with the applied cover layers 24 and a region without applied cover layers 24. At the very bottom, the representation in FIG. 5 shows an enlargement of the region labeled "F" in the lengthwise cross-section along the cross-section line E-E. Here too— just like in the enlargement of the region labeled "B"—it can be seen that the cover layers 24 lie flat on the hemisphere panels 16, 18 and in a plane parallel to the plane of the panels 10 of the hemisphere panels 16, 18. There, they are for example glued onto the outward facing surfaces of the hemisphere panels 16, 18, or are in an otherwise suitable manner detachably or non-detachably connected to these.

It can be seen in the cross-sections that cover layers 24 applied on the outer side of a core element 20 formed with hemisphere panels 16, 18 conceal the back sides or inner sides of the elevations 12 (that is to say the indentations resulting from the elevations 12). This creates a contiguous surface area on the core element 20.

Figure 6:
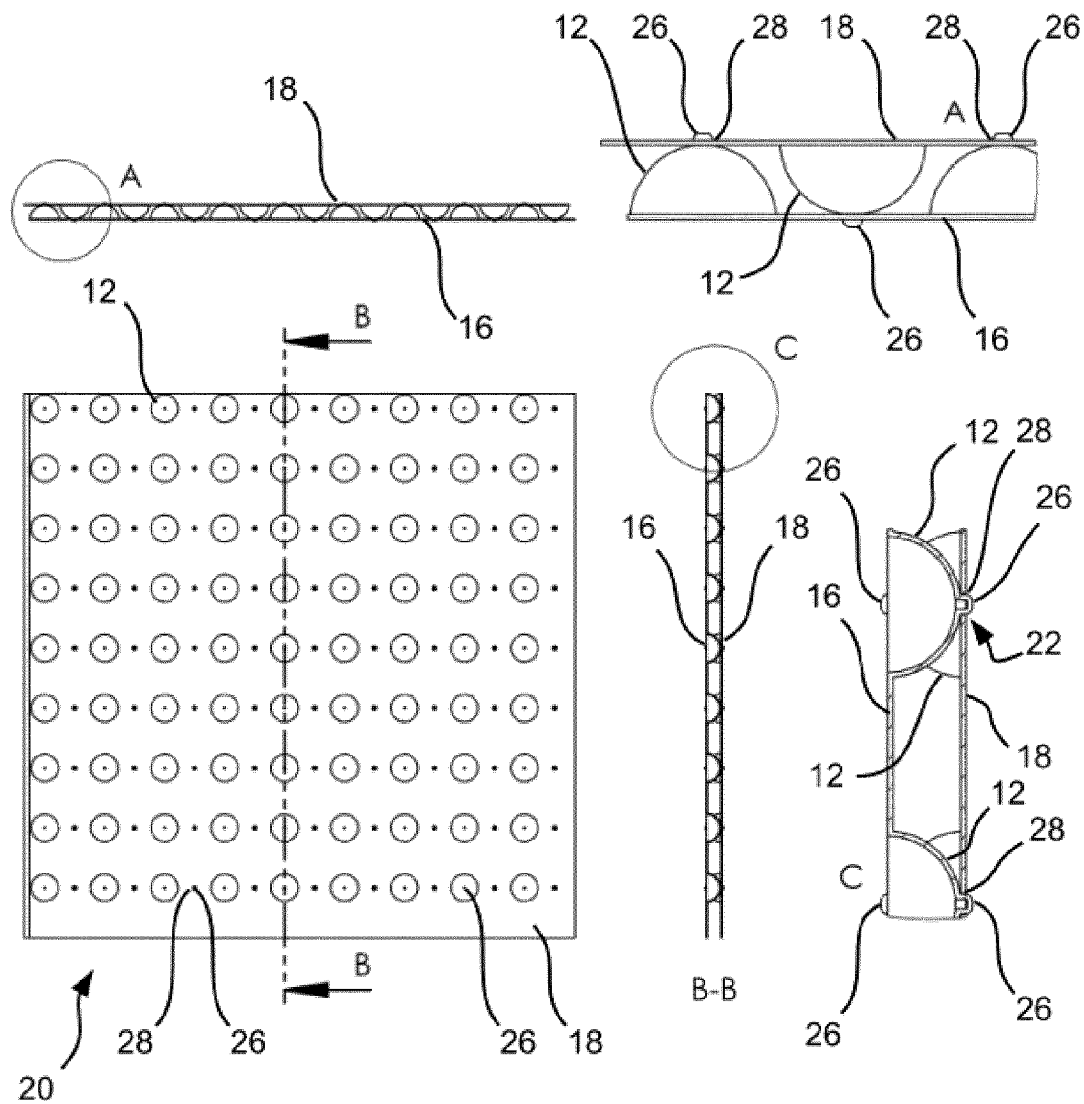

The representation in FIG. 6 shows a special embodiment of a core element 20 formed with two hemisphere panels 16, 18 of the type described above. The representation shows in the lower left region a top view onto such a core element 20. The latter is followed above by a side view onto the core element 20, and on the right by a cross-section through the core element 20 (cross-section along the cross-section line B-B). Certain regions are highlighted in the side view and in the cross-section view, and said regions are shown as enlargements next to the side view and next to the cross-section view.

The special feature of this embodiment is that at least a plurality of elevations 12, in particular all elevations 12, have hump-shaped extensions hereinafter called dimple 26 pointing radially outward and forming a single part with the remaining elevation 12. An elevation 12 with an apex point has—as shown—exactly one dimple 26. An elevation 12 with an apex surface—not shown—has at least one dimple 26, in particular in the center of the apex surface, or a plurality of dimples 26, for example distributed equidistantly along the circumference line of the apex surface. Dimples 26 on the apex points of the elevation 12 are readily evident specifically in the enlargements of the side views and cross-section view.

The dimples 26 of the elevations 12 of a hemisphere panel 16, 18 reach through the openings 28 arranged to accommodate said dimples 26 in the respectively other hemisphere panel 16, 18. The width and the geometry of the openings 28 are matched to the cross-section geometry of the dimples 26. The openings 28 accommodate the dimples 26 (respectively one opening 28 for exactly one dimple 26) in at least a shape lock.

Based on the at least shape-locking accommodation of the dimples 26 in the openings 28, the openings 28 can barely be differentiated from the dimples 26 in the top view onto such a core element 20. Regarding the sole—upper—hemisphere panel 18 visible in the top view, the vantage point shows the inner surface of the elevations 12, and the dimples 26 (essentially the rear sides of the dimples 26 or the inner surfaces of the dimples 26) are visible in the center of the elevations 12. In the interest of maintaining clarity of the representation, this is only labeled once. The dimples 26 of the bottom hemisphere panel 16 (not visible in the top view) are accommodated by the openings 28 in the upper hemisphere panel 18. The representation shows this as a circle with a noticeably smaller diameter in comparison to the representation of the elevations 12 in the upper hemisphere panel 18. In the interest of maintaining clarity of the representation, this too is only labeled once and the relevant reference lines essentially point to the same location, that is once to the center of the circle and to the dimple 26 located there, and once to the outer circumference line of the circle and the opening 28 it represents.

The connection between two hemisphere panels 16, 18 by means of the dimples 26 captured by the latter and the openings 28 effects at least an adjustment of the hemisphere panels 16, 18 relative to each other in an orientation substantially determined by the position of the openings 28. All openings 28 of each hemisphere panel 16, 18 are distributed in a uniform matrix array along the surface area of the respective hemisphere panel 16, 18. This array corresponds to the elevation array, that is to say to the array of the distribution of the elevations 12 of the same hemisphere panel 16, 18, and therefore also to the array of the dimples 26 of the same hemisphere panel 16, 18. Because a combination of two hemisphere panels 16, 18 into a core element 20 involves combining two equivalent (as defined further above) hemisphere panels 16, 18, the array of the dimples 26 and of the openings 28 of both hemisphere panels 16, 18 are equivalent. Each dimple 26 of one of the hemisphere panels 16, 18 therefore has an associated, matching opening 28 in the respectively other hemisphere panel 16, 18.

In the embodiment shown in FIG. 6, the openings 28 of each hemisphere panel 16, 18 are arranged symmetrically between the dimples 26 of the same hemisphere panel 16, 18. This is the preferred embodiment, but is nevertheless a principally optional embodiment.

A connection of two hemisphere panels 16, 18 using the dimples 26 and openings 28 comprised by these can already represent a connection sufficient to obtain a core element 20 formed by the two hemisphere panels 16, 18 connected to each other in this manner. Preferably, but principally optionally, the hemisphere panels 16, 18 are additionally connected to each other in the region of the dimples 26 and openings 28, for example by gluing or by melting regions of the dimples 26 that reach through the openings 28. For the purpose of melting, the dimples 26 have an effective height that is at least greater than the thickness of the panel 10 in the region of the opening 28. The melting operation regularly results at least sectionally in a single-part connection of the melt of the dimples 26 with the immediate contact region of the openings. The melting of the regions of the dimples 26 that reach through the openings 28 results in a deformation of the dimples 26 at least in said regions, said deformation in the manner of a rivet connection preventing the dimples 26 from detaching from the respective opening 28.

Figure 4:
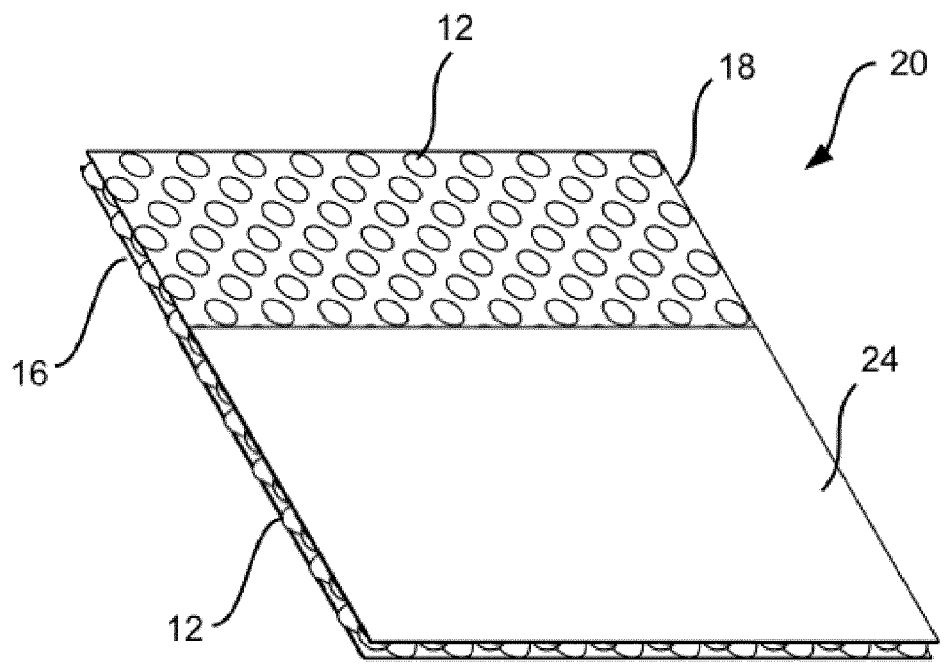
Figure 7:
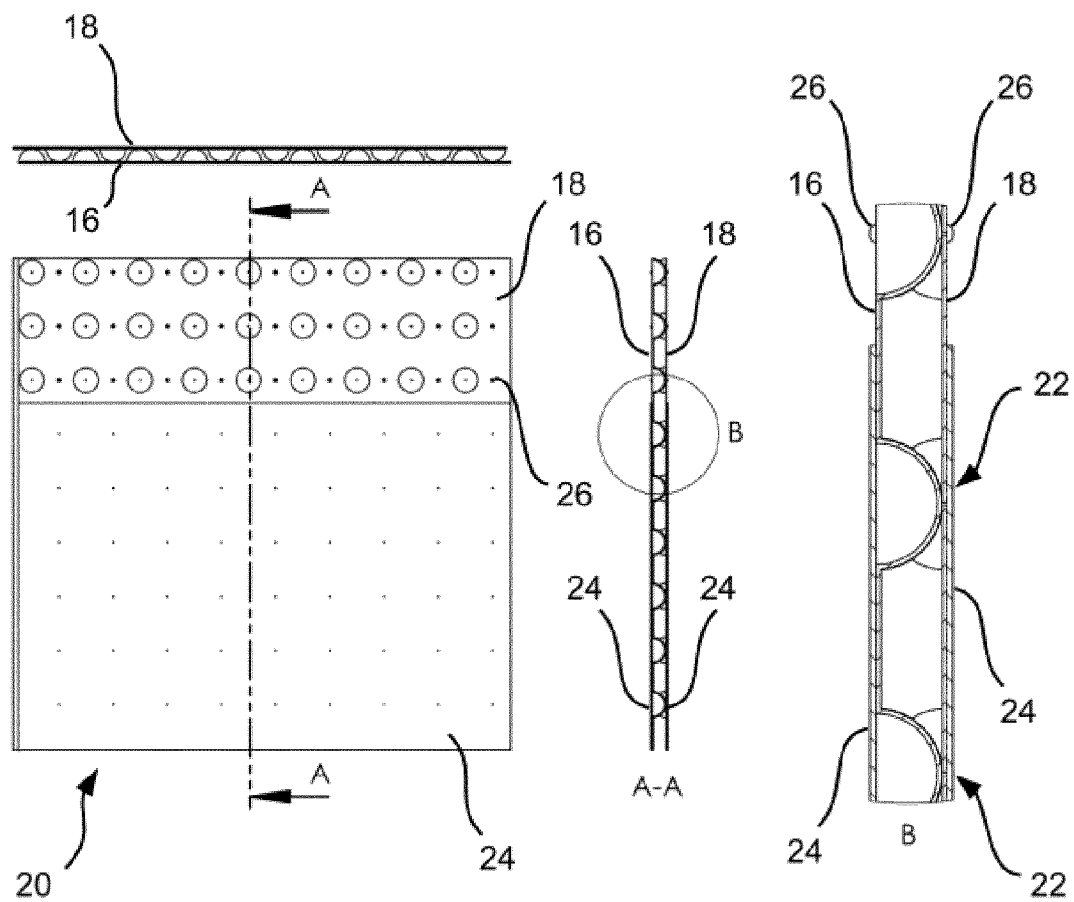

Precisely as previously specified based on the representations in FIG. 4 and FIG. 5, a core element 20 with hemisphere panels 14; 16, 18 connected or at least pre-adjusted using dimples 26 and openings 28 is optionally fitted with a cover layer 24 on one or both sides. The representation in FIG. 7 shows an example. In order to avoid unnecessary repetitions, reference is made to the details shown in the representations in FIG. 6 and FIG. 5 regarding the discussion of the shown details.

Figure 8:
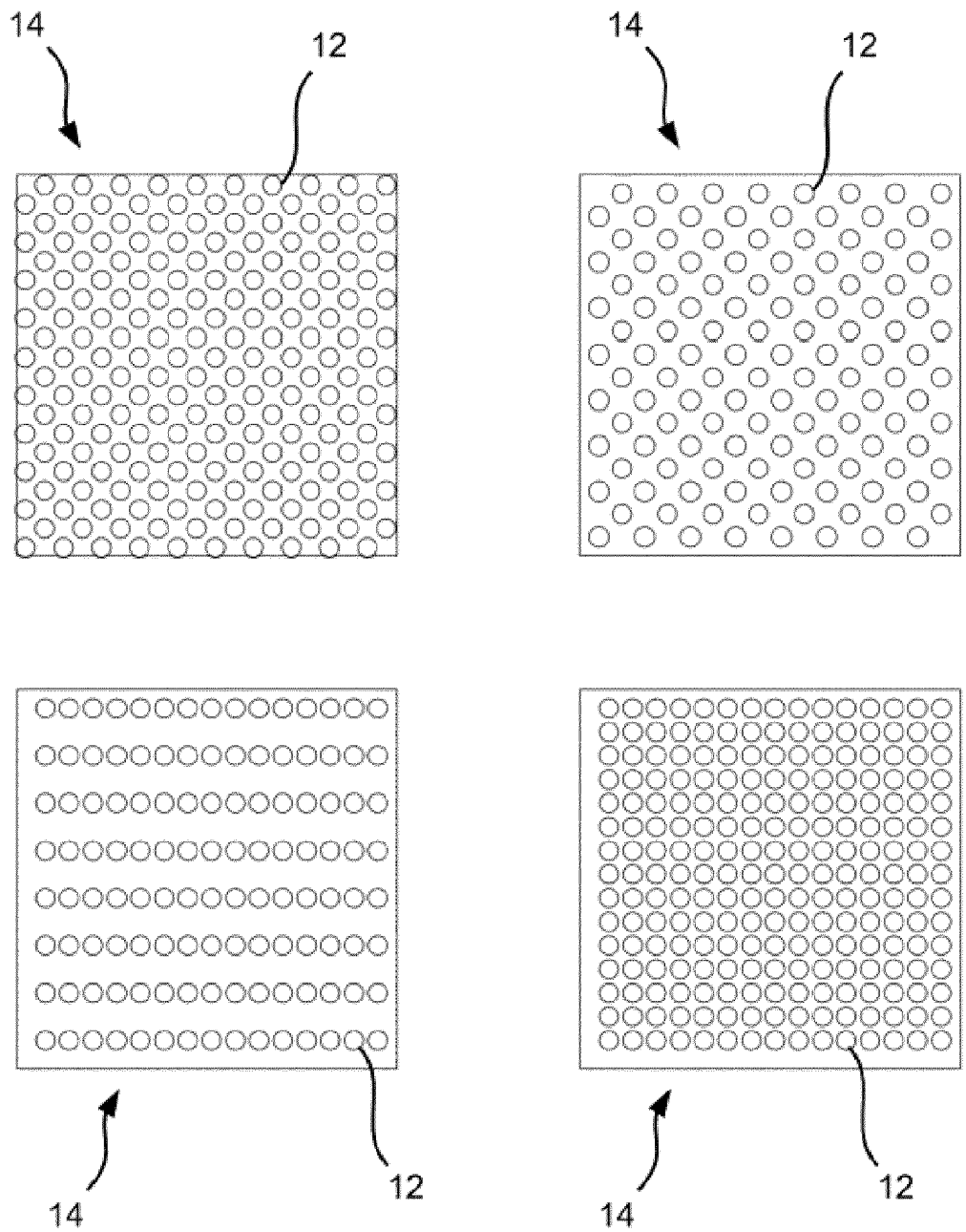

The representation in FIG. 8 illustrates that various patterns (different arrays/elevation arrays) are conceivable in regards to the number and arrangement of the elevations 12 of a hemisphere panel 14—with and without dimples 26 and openings 28—and wherein the arrangements shown in the representation in FIG. 8 are expressly only exemplary and not final.

This concludes the specification of the basic structure and of one embodiment (with dimples 26 and openings 28) of a hemisphere panel 14 that is conceivable in a core element 20 as the bottom hemisphere panel 16 or as the upper hemisphere panel 18, and for a core element 20 having two hemisphere panels 14.

Figure 9:
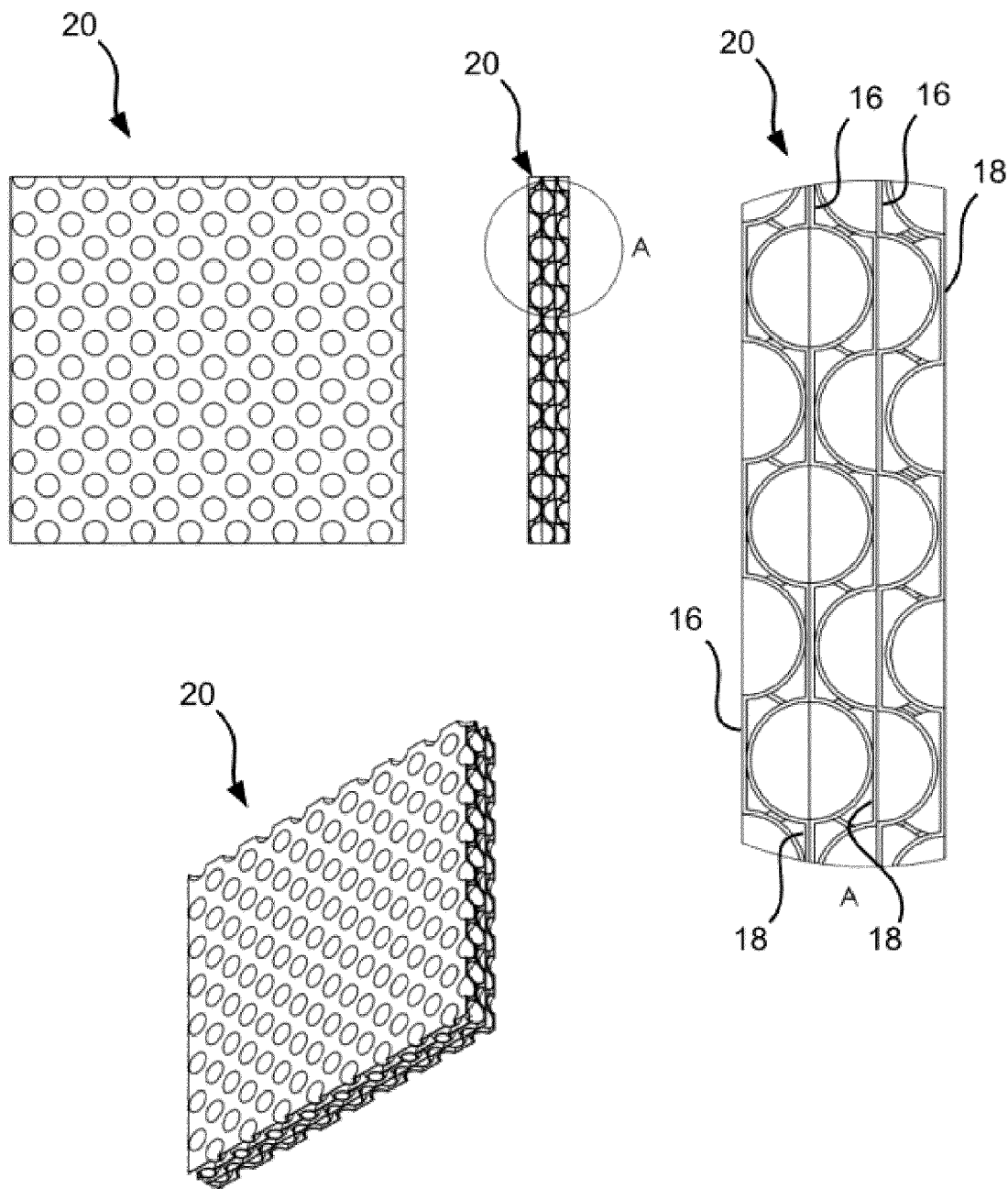
Figure 10:
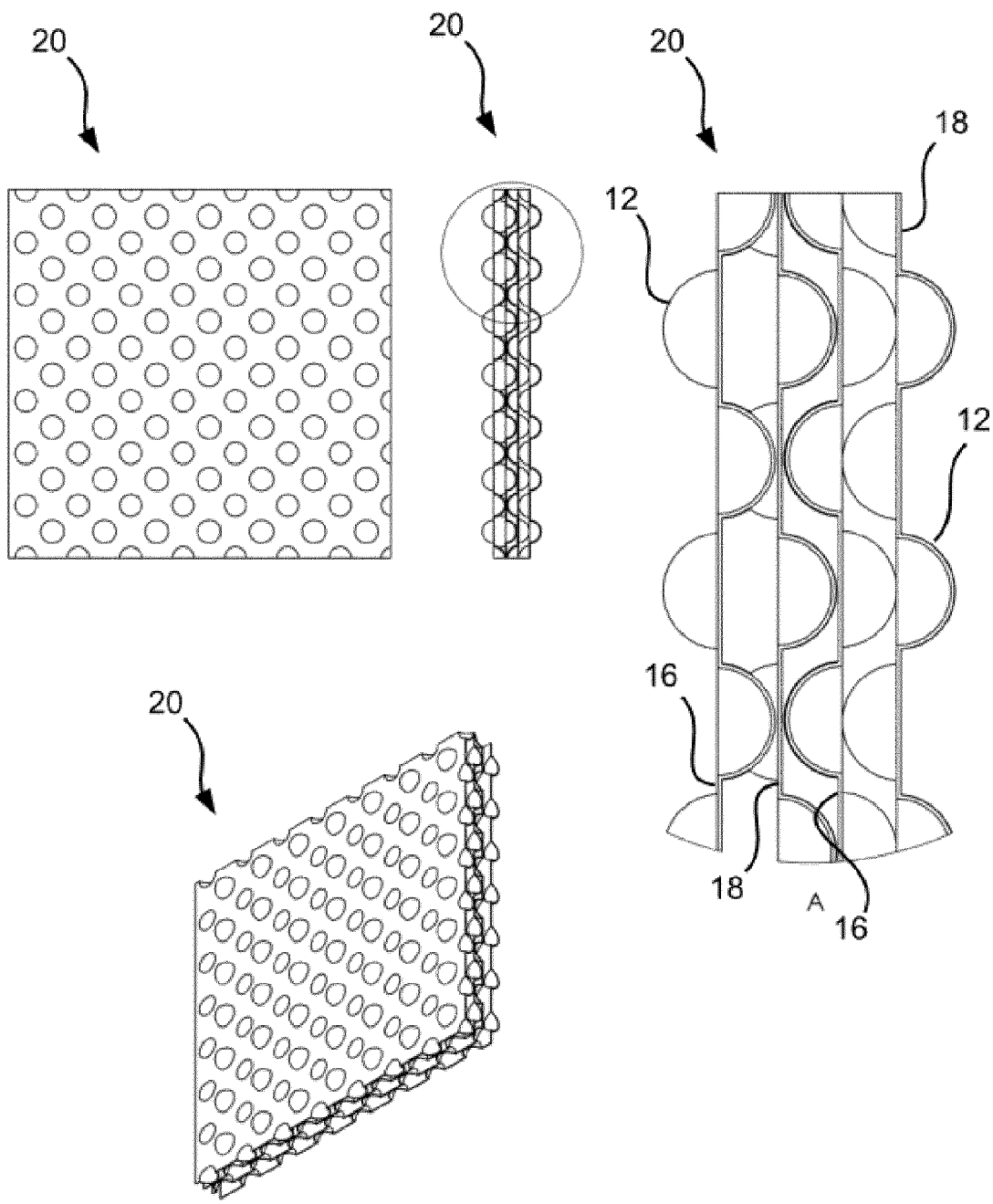

The representations in FIG. 9 and FIG. 10 show a special embodiment of a core element, that is to say a core element 20 comprising several planes.

Such a core element 20 comprising several planes is for example (FIG. 9) formed by connecting several core elements 20 of the previously described type. Respectively two core elements 20 are in this case connected with their major surfaces facing each other, for example by gluing, welding, melting, or the like. The representation in FIG. 9 shows a top view, a cross-section view, an enlarged section from the cross-section view, and an isometric view of such a core element 20. A core element 20 having three planes is shown as an example, wherein each plane is formed by a core element 20 of the previously described type. The core element 20 shown in FIG. 9 accordingly comprises three bottom hemisphere panels 16 and three upper hemisphere panels 18, wherein—as before—respectively one bottom hemisphere panel 16 and one upper hemisphere panel 18 form a plane in the core element 20.

More or less than two planes are principally also conceivable, for example five, ten, or one-hundred planes, and are also covered by the invention. With regard to details of the individual planes, reference is made to the specification for a core element 20 comprising exactly two hemisphere panels 14; 16, 18. A region of a core element 20 with a larger number of planes, for example ten, twenty planes, or the like can for example act as a (load-bearing) structural member (automotive body member, load-bearing structural component, shock absorber system).

The representation in FIG. 10 also shows a core element 20 comprising several planes. The special feature in this case is that at least one hemisphere panel 14—in contrast to what is specified above—not only has elevations 12 that point in one direction, but also has elevations 12 that point in the opposite direction. Such a hemisphere panel 14 has an outer surface like two hemisphere panels 14 connected to each other of the type specified above, wherein the connection is made using the respective back sides, so that the elevations 12 each point outward. Where the elevations 12 of such hemisphere panels 14 face each other when two hemisphere panels 14 are combined, the entire preceding specification also applies for such a combination, so that reference is made thereto for purposes of avoiding repetitions. When two hemisphere panels 14 are combined—in particular by gluing or the like and/or connected with dimples 26 and openings 28—one of the two hemisphere panels 14 acts as the bottom hemisphere panel 16 and the other hemisphere panel 14 acts as the upper hemisphere panel 18, so that reference can also in this regard be made to the preceding specification.

A single-layered or multi-layer core element 20 with a hemisphere panel 14 and/or hemisphere panels 14 with elevations 12 pointing in opposite directions can be covered on one or both sides with a hemisphere panel 14 with elevations 12 respectively pointing in only one direction or with a cover layer 24.

What is stated above regarding the number of planes and use of a core element with a higher number of planes also applies likewise for a multi-layer core element 20 with at least one hemisphere panel 14 with elevations 12 pointing in opposite directions. The number of planes is therefore principally arbitrary and an application involving use as a (load-bearing) structural member is for example conceivable.

The specification will now address the possible applications of the core element 20 proposed here. The discussion to follow applies to core elements 20 with hemisphere panels 14; 16, 18 with and without dimples 26 and openings 28 and to single-layer core elements 20 (FIGS. 1 to 7) and also to multi-layer core elements 20 (FIGS. 9, 10).

Figure 11:
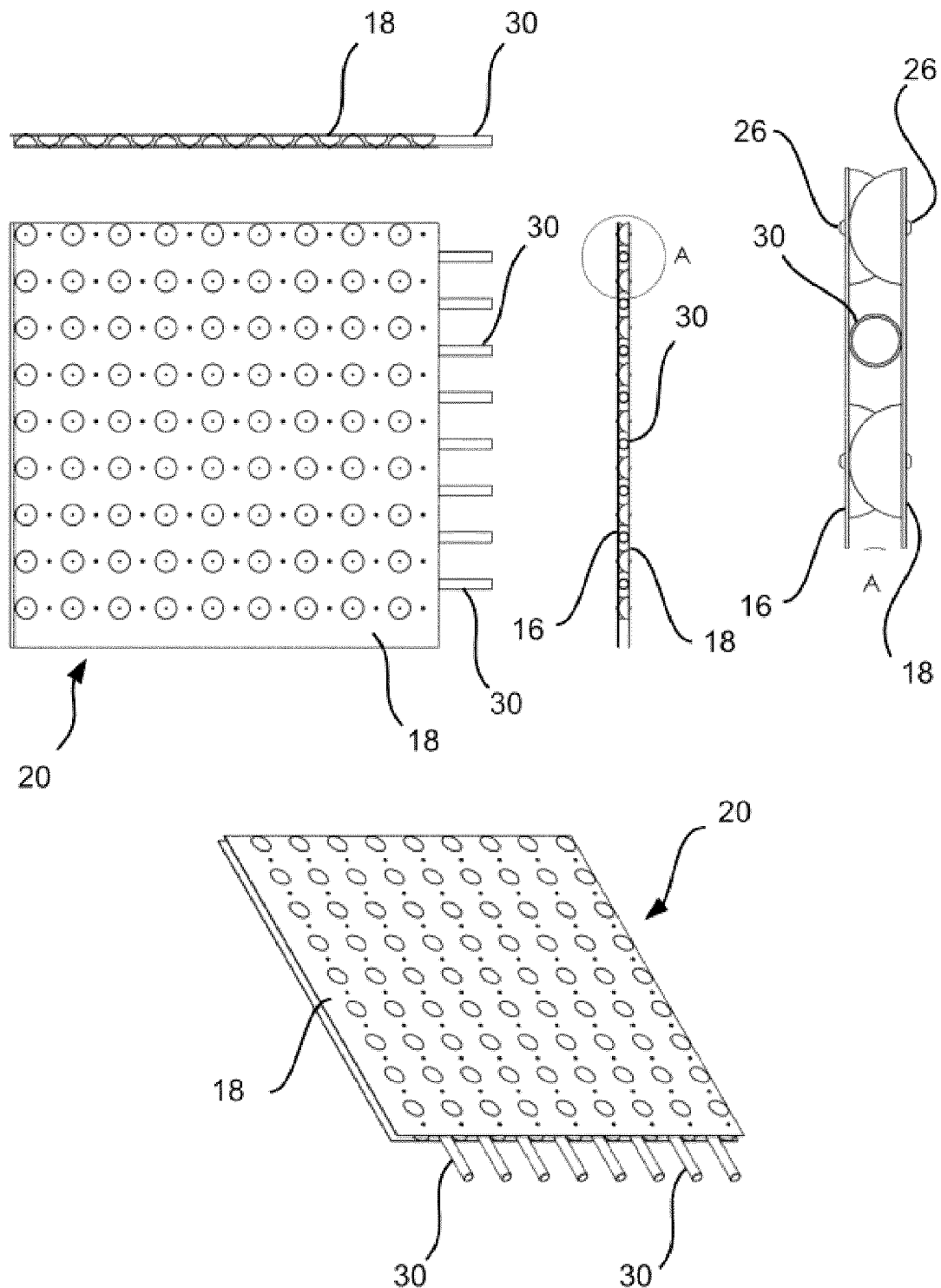

Based on representations similar to those shown in individual preceding Figures (top view, side view, lengthwise cross-section, and enlargement from the lengthwise cross-section, and isometric view), the representation in FIG. 11 shows a core element 20 with lines 30 embedded in the interior of the core element 20. Such a core element 20 is for example conceivable as a construction element with line guides, wherein the lines 30 are for example pipes, cables, or the like. The lines 30 are embedded in the interior of the core element 20, and therein firstly between the planar regions (panel 10) of the hemisphere panels 16, 18 and between adjacent elevations 12 of the hemisphere panels 16, 18. The array dimension of the elevations 12 can be adjusted to obtain additional clearance for the lines 30 or to obtain clearance for a larger number of lines 30, for example in the manner shown in the example represented in FIG. 8.

An outer diameter of the lines 30 and a distance between the hemisphere panels 16, 18 in the interior of the core element 20 are preferably and in a principally optional manner matched to each other. On such an embodiment, the core element 20 secures the lines 20 in its interior at least based on a friction lock. Additionally or alternatively, the lines 30 are connected to at least one hemisphere panel 16, 18, for example by gluing.

Using such lines 30, a core element 20 of the type specified in this application can for example be used as a wall, floor, or ceiling heater—collectively called panel heater—or as part of a panel heater formed from several core elements 20. A core element 20 usable as a panel heater or part of an panel heater is likewise conceivable for cooling purposes. The core element 20 itself has no influence on the function, and the function as a heater or for cooling purposes is only determined by the respective temperature of the flowing medium. Accordingly, using such lines 30, a core element 20 of the type specified in this application can also be used as a wall, floor, or ceiling cooler—collectively called panel cooler—or as part of a panel cooler formed from several core elements 20. Use of at least one core element 20 as a panel heater or panel cooler is part of the invention.

Likewise, such a core element 20 can be used as a sun collector or as part of sun collector formed from several core elements 20. The lines 30 in this case are lines 30 through which a flowable medium/a liquid heat transfer medium, such as oil, water, or the like, can be guided. When operating a panel heater formed with at least on such core element 30 or when operating a sun collector formed with at least one such core element 30, a flowable medium/a liquid heat transfer medium of the aforementioned type flows through the lines 30. Use of at least one core element 20 as a sun collector is part of the invention.

When a core element 20 acts as a sun collector or as part of a sun collector, the core element 20 is preferably black on the side facing the sun's radiation, for example fitted with a black cover layer 24. For an embodiment without cover layer 24, the core element 20 is fitted with a black paint layer or the like or is produced from black material. Black is in this case defined as any coloring or any body color that reflects essentially no light when the core element 20 is illuminated with at least different light frequencies.

The core element 20 of the type specified in this application can generally also accommodate a volumetric flow of a liquid or gaseous medium without special lines 30 in the interior of the core element 20. In this case, the two hemisphere panels 14; 16, 18 forming the core element 20 are then connected on two perimeter sides, in particular on two opposing perimeter sides, in a manner that makes a seal for the respective medium (edge seal), for example by gluing, welding, and the like. The respective medium can then flow through the resulting core element 20 with the two remaining open perimeter sides from one of the open perimeter sides to the other open perimeter side.

Such a core element 20 is also conceivable as a panel heater or panel cooler, as part of a panel heater or panel cooler formed from several core elements 20, as sun collector or as part of a sun collector formed from several core elements 20. Use of such a core element 20 in the specified sense in also part of the invention.

When such a core element 20 functions as a sun collector or as part of a sun collector formed from several core elements 20, such a core element 20 is preferably embodied black as defined above.

For the two embodiments of a core element 20 that accommodate a volumetric flow (with lines 30; with edge seal), an embodiment is also conceivable wherein the core element is translucent on one side, that is to say translucent, or substantially translucent, at least for infrared radiation. One of the hemisphere panels 14; 16, 18 is then in this sense radiation-permeable and is for example made from a corresponding plastic.

Figure 12:
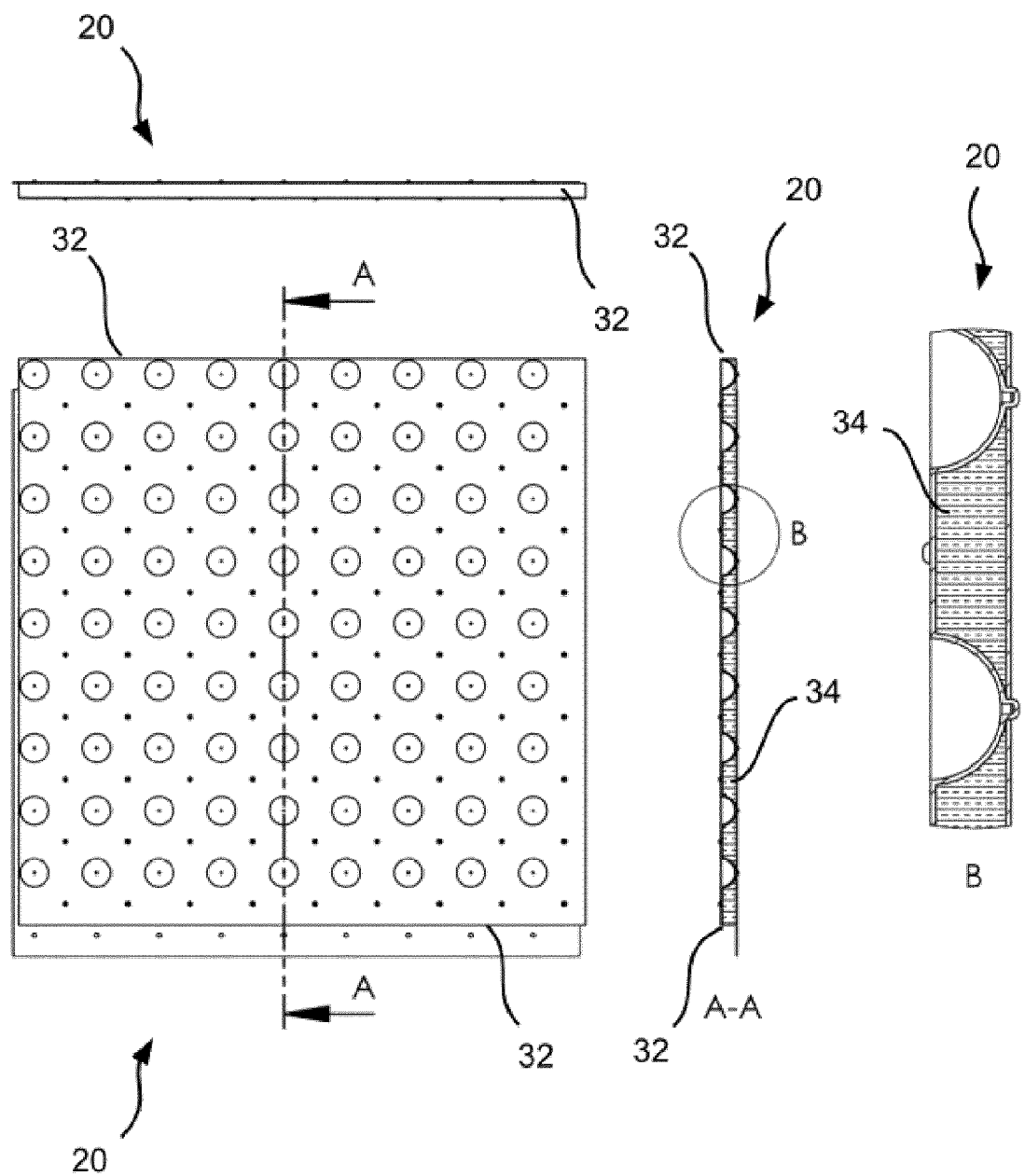

Based on an example of a core element 20 with dimples 26 on the elevations 12 and openings 28 in the planar regions of the hemisphere panels 14; 16, 18, the representation is FIG. 12 shows a special embodiment of a core element 20 wherein the two hemisphere panels 14, 16, 18 are connected to each other on two perimeter sides—as shown—on two opposing perimeter sides.

The representation in FIG. 12 shows the core element 20 with views like many in the preceding figures (top view, side views, cross-section view, and enlarged section from the cross-section view). The perimeter seal is readily evident in the side view shown above the top view onto the core element 20, and specifically also when comparing this side view with the side views in FIG. 6 and FIG. 7. Whereas the elevations 12 are visible in the interior of the core element in the side views in FIG. 6 and FIG. 7 (because the perimeter sides are open in these), the vantage point in the side view in FIG. 12 shows the perimeter connection 32 between the two hemisphere panels 16, 18, and the elevations 12 are not visible (because they are located behind said connection and in the interior of the core element 20). Due to the perspective, the perimeter connections 32 are not visible in the top view onto the core element 20. The location of the two perimeter connections 32 is respectively labeled in the representation. The perimeter connections 32 are visible and labeled accordingly in the cross-section representation along the cross-section line A-A. Based on crosshatching in the free region in the interior of the core element 20, the cross-section representation shows that such a core element 20 can be filled with a medium 34, and that a medium 34 can in particular flow through the core element 20 from one of the open perimeter sides to the other open perimeter side (in the shown top view from right to left or from left to right). The medium 34 is preferably a liquid or gaseous medium 34. The perimeter connection 34 makes a seal for the respective medium 34. Such an embodiment of a core element 20 is conceivable as a panel heater, panel cooler, or as a sun collector or as an element of a panel heater or panel cooler or a sun collector. Reference is made to the discussion above in the interest of avoiding unnecessary repetitions.

The representation in FIG. 12 already sufficiently illustrates yet another possible embodiment of a core element 20 or a view of a multi-layer core element 20. The interior of the core element labeled in FIG. 12 with the reference symbol 34 can in fact also be an insulating material 34, in particular PUR foam or the like. Instead of being filled with a flowing medium 34 (where applicable), the interior of the core element 20 is then filled with the insulating material 34.

Such an embodiment is likewise conceivable for a core element 20 with hemisphere panels 14; 16, 18 with and without dimples 26 and openings 28. Depending on the type of insulating material 34 and depending on the type of filling of the interior of the core element 20 with the respective insulating material, a filling of the core element 20 is also conceivable without a perimeter seal of the core element 20, for example when the insulating material 34 does not flow or has limited flow propensity and/or when the filling is applied in a mold surrounding the core element 20.

Figure 13:
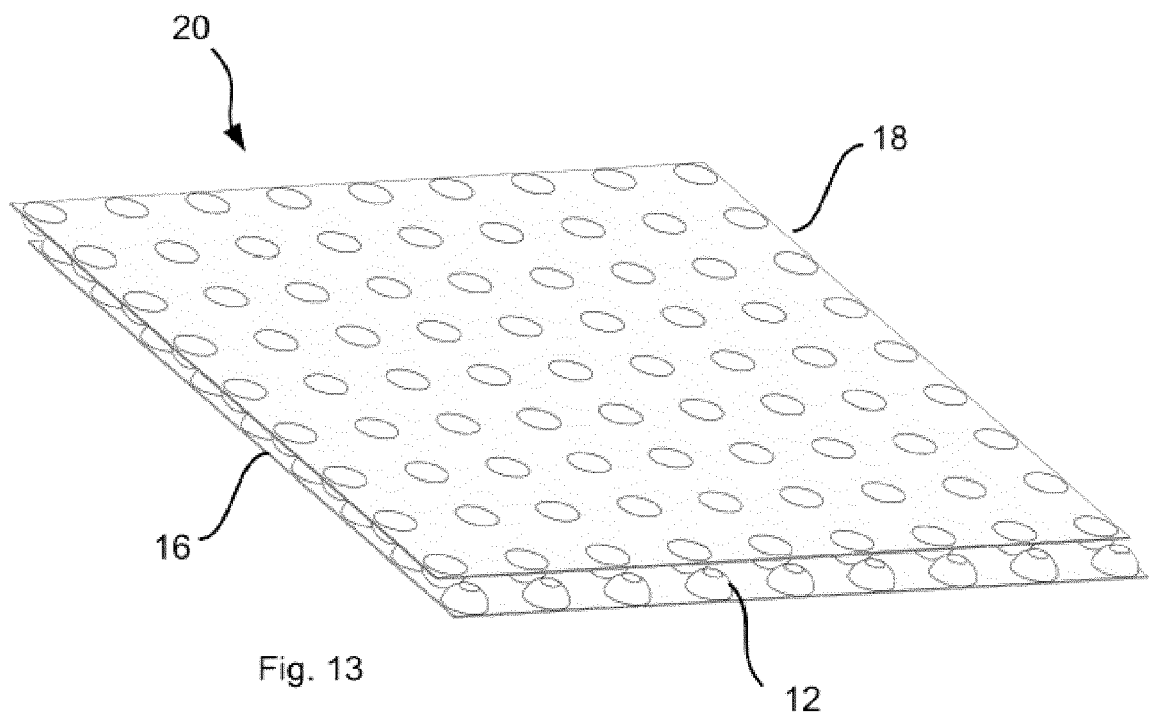
Figure 14:
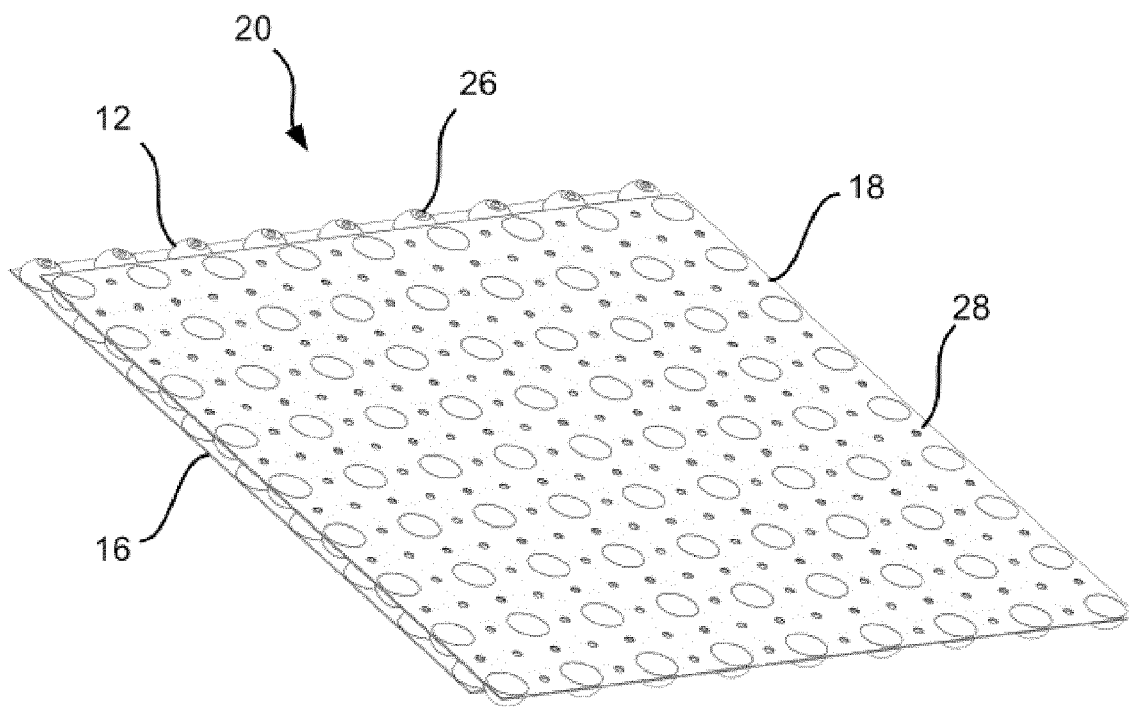
Figure 15:
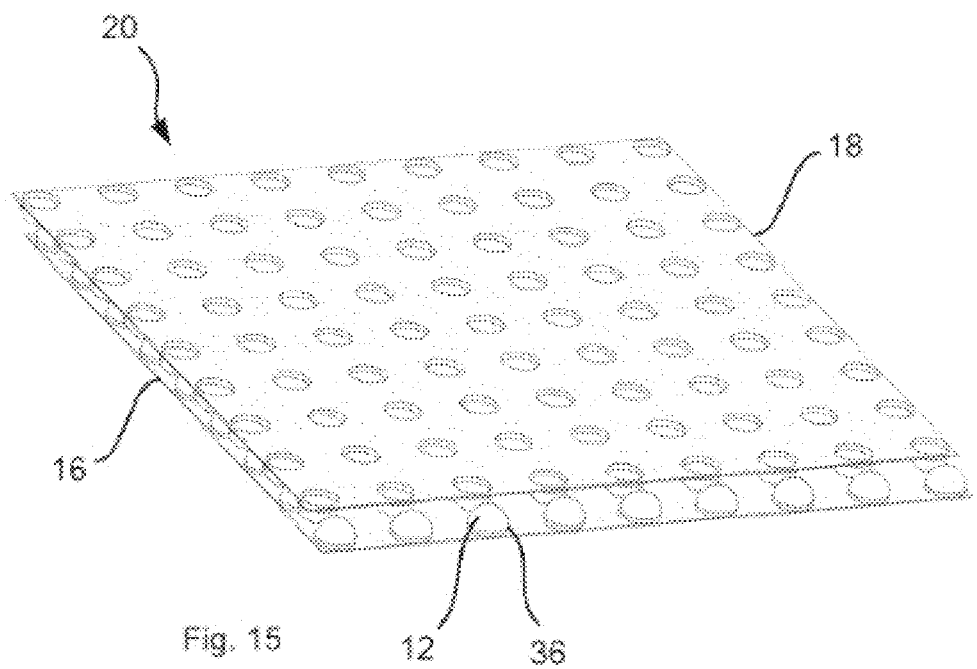
Figure 16:
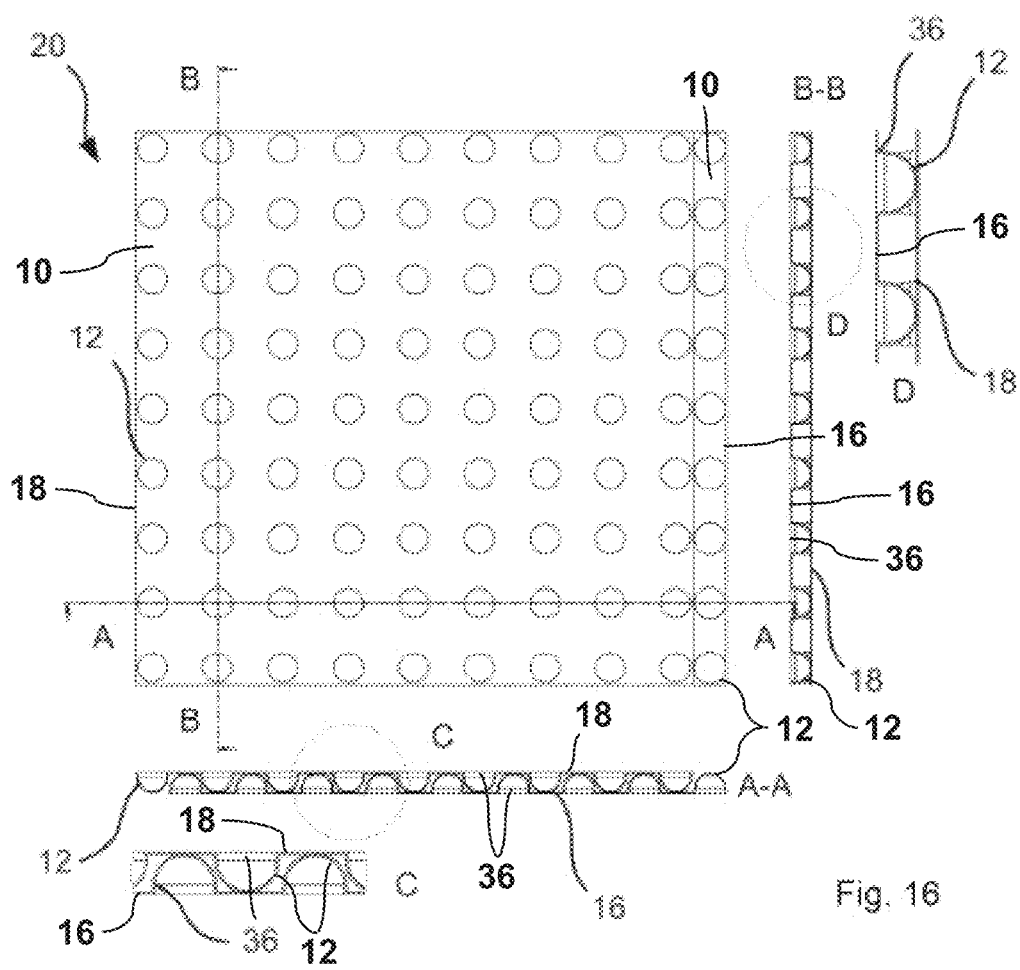

The further representations (FIG. 13 to FIG. 16) show possible variants of the shape of the elevations 12. All shown variants are conceivable for all embodiments specified above and below. The representation in FIG. 13 shows a core element with flattened elevations 12 (elevations 12 shaped as a hemisphere layer). The flattened elevations 12 do not have an apex point but an apex surface. Every elevation 12 makes contact with the apex surface to a planar region of the respectively other hemisphere panel 14; 16, 18. The representation in FIG. 14 shows a core element 20 with flattened elevations 12 as in FIG. 13, wherein each flattened elevation has a dimple 26 in the center of its apex surface. Here too, every elevation 12 makes contact with the apex surfaces to a planar region of the respectively other hemisphere panel 14; 16, 18, wherein each dimple 26 engages into a recess 28 designated for this purpose in the other hemisphere panel 14; 16, 18. The representations in FIG. 15 and FIG. 16 show an embodiment wherein the elevations 12 for example have an annular region 36 as their base. The elevations are then sectionally cylindrical, that is to say at the transition from the planar regions of the panel 10 to the curved regions. A shape with and without dimples 26 and with and without flattening is conceivable for the ends of such elevations.

Figure 17:
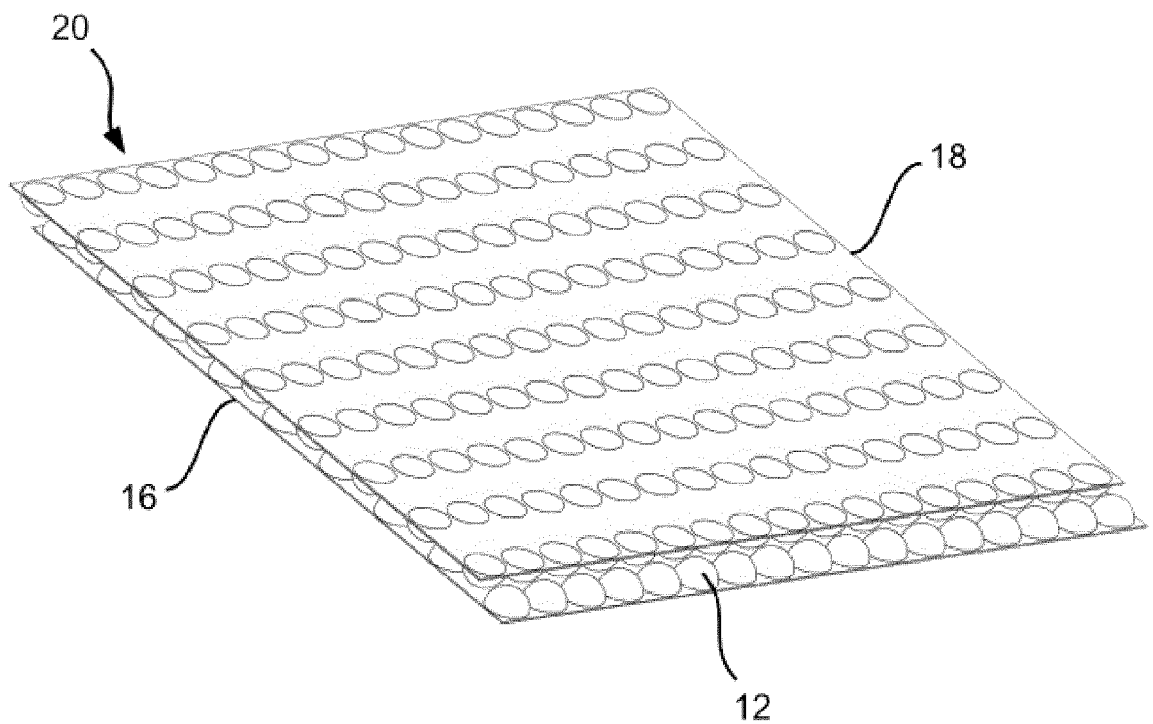
Figure 18:
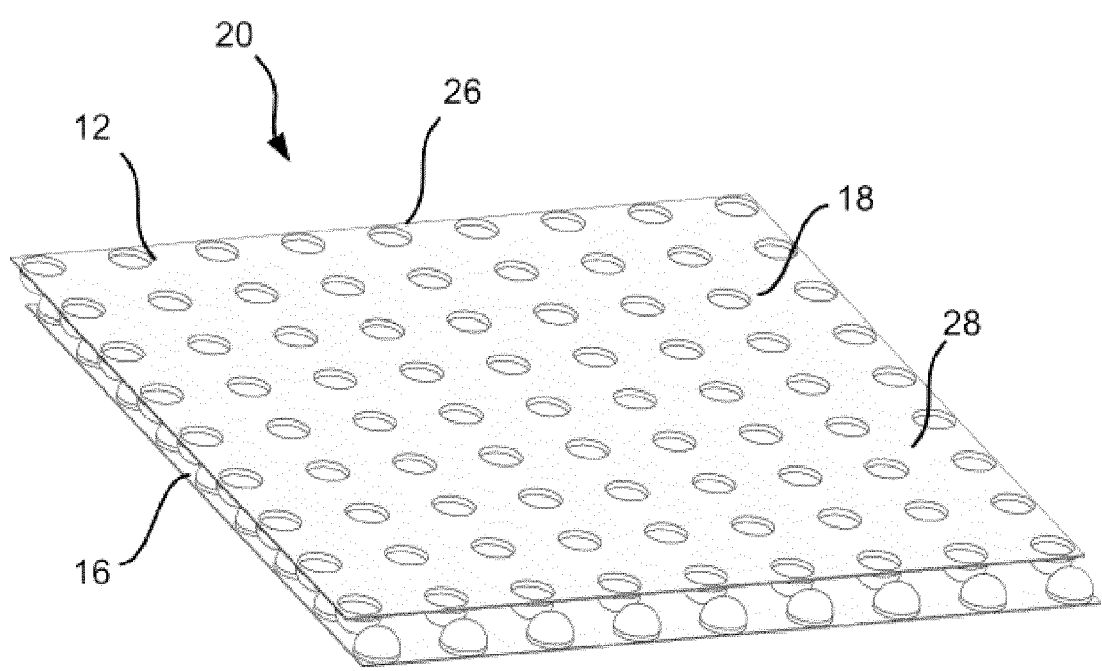

The yet further representations (FIG. 17 and FIG. 19) show examples of possible arrangements of the elevations 12 on hemisphere panels 14; 16, 18. The representation in FIG. 17 shows an embodiment with a linear arrangement of the elevations, wherein the elevations 12 only have a small distance between then along each line of elevations 12, and respectively all elevations 12 of a line are accommodated in the region of the respectively other hemisphere panel 14; 16, 18 in a free region between parallel lines located there. The representation in FIG. 18 shows an embodiment with a likewise linear arrangement of the elevations 12 (elevations 12 with an annular region 36 are shown here as an example). In this case, sufficient space is allotted along each line to accommodate an elevation 12 of the respectively other hemisphere panel 14; 16, 18. As shown, the two hemisphere panels 14; 16, 18 can consequently be combined with an overlapping arrangement of the lines. Space remains between the lines that can for example be used for lines 30 or a medium flowing without lines 30. The two hemisphere panels 14; 16, 18 can likewise (not shown) be combined in an arrangement of respectively one line of elevations 12 of the one hemisphere panel 14; 16, 18 between two lines of elevations of the other hemisphere panel 14; 16, 18.

Figure 19:
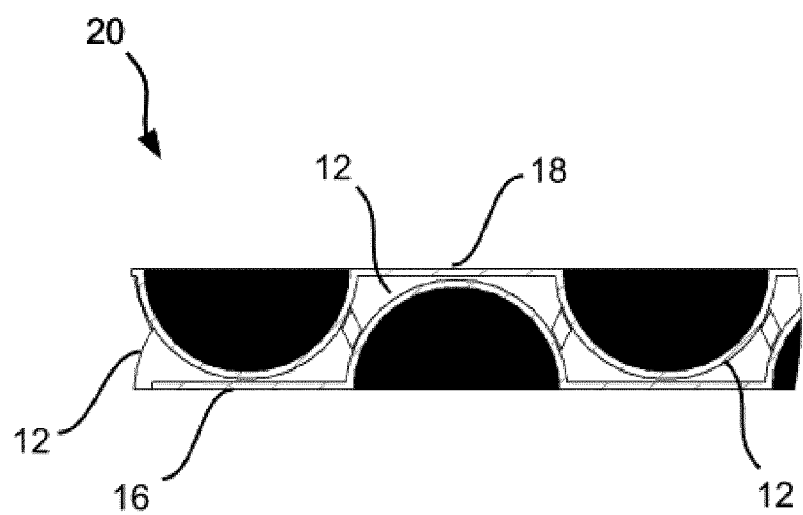

The representation in FIG. 19 finally shows an enlarged section from a cross-section through a core element 20 (like in FIG. 3, FIG. 5, etc.), and in this case a special, optional embodiment wherein the elevations 12 are filled. Filling the elevations 12 for example has the effect of increasing the compressive strength of each elevation 12 and therefore increases the overall compressive strength of a core element 20 formed with hemisphere panels 14; 16, 18 with filled elevations 12. A filling with so-called intumescent materials (intumescent construction materials) is for example conceivable for optimizing fire protection properties. Intumescent construction materials in a principally known manner increase in volume and decline in density accordingly when exposed to heat. Filled elevations 12 are also conceivable for multi-layer core elements 20 according to FIG. 9 and FIG. 10 and the specification therein. Intumescent construction materials are generally used for preventive construction-based fire protection, where they perform one or several of the following tasks:

Foaming up, that is to say forming a lightweight insulation layer as a thermal barrier. Example: substances incorporated into the insulation of a cable (such as expanding graphite/bloating graphite) release gases when exposed to heat. A "foamed" ash layer is created together with the ash-forming insulating material that inhibits the oxygen supply and therefore inhibits the spread of flames;

Endothermal effect with hydrates that cool by releasing water vapor;

Apply expansion pressure, for example to seal plastic pipe feed-throughs (through a wall or concrete ceiling) in a fire emergency.

Intumescent construction materials are also called "insulation layer forming agents". The—essentially known—effects of intumescent construction materials described above can also be advantageously combined together with the core element 20 proposed here, in that its elevations 12 (or at least a large number of the elevations 12 comprised by the core element 20) are filled with such a construction material.

Although the invention was illustrated and specified in detail by the exemplary embodiment, the invention is not restricted by any one, or the, disclosed examples, and the person skilled in the art can derive other variations from these without departing from the protected scope of the invention.

Individual aspects that are the primary focus of the specification submitted hereby can then be briefly summarized as follows: first and foremost, a core element 20 for sandwich elements is specified, wherein the core element 20 comprises at least two hemisphere panels 16, 18 that are combined with each other, wherein each hemisphere panel 16, 18 comprises uniform hemispherical elevations 12 or elevations 12 shaped as sphere segments or sphere layers—generalized as elevations 12—between planar regions 10 and spaced at a distance between each other, in particular in a matrix-shaped elevation array, the elevations 12 in at least one region or one section having the shape of an ellipsoid layer, in particular in a region or section that has an outer surface in the shape of an ellipsoid layer along a contiguous circumferential line, wherein both or respectively two hemisphere panels 16, 18, in particular hemisphere panels 16, 18 with an equivalent elevation array, face each other with their elevations 12, and wherein on two or in each case two hemisphere panels 16, 18 combined with each other, the elevations 12 of a hemisphere panel 16, 18 make contact with their apex points or apex surfaces respectively in one planar region of the other hemisphere panel 16, 18.

The core element 20 proposed here is not only conceivable as a core element 20 for sandwich elements, but can also be used independently and primarily also by itself as a sandwich element or in place of previous sandwich elements.

An individual hemisphere panel 14 that based on the approach proposed here forms a core element 20 together with at least on further hemisphere panel 14, is also conceivable for applications without a further hemisphere panel 14. In that case, the elevations 12 of the individual hemisphere panel 14 are covered by a cover layer 24, and the individual hemisphere panel 14 and the cover layer 24 together form a sandwich element. Such a sandwich element can principally also be used in the same manner as was specified above for the core element 20 formed from at least two hemisphere panels 14, and the above discussion also applies likewise for such a sandwich element. The elevations 12 of the individual hemisphere panel 14 can have all shapes specified here, and can also have dimples 26 or no dimples 26. For elevations 12 with dimples 26, the cover layer 24 has recesses 28 to accommodate the dimples 26—as specified further above. Everything stated above also applies likewise for the arrangement and distribution of the elevations 12 on such a hemisphere panel 14 combined into a sandwich element together with at least one cover layer 24.

The core element 20 proposed here with at least two hemisphere panels 14 or alternatively also a sandwich element with one hemisphere panel 14 is conceivable by itself or together with further core elements 20 and/or sandwich elements, for example for the following applications: interior wall, cabin wall, outer wall, bulkhead wall, automotive body, fire protection element, fire protection wall, acoustic panel, thermal insulation panel, sun collector, panel heater/panel cooler, construction panel with line guides (cables, pipes, etc.), and so on.

LIST OF REFERENCE SYMBOLS

10 Panel; planar region
12 Elevation
14 Hemisphere panel
16 (Bottom) hemisphere panel
18 (Upper) hemisphere panel
20 Core element
22 Contact location
24 Cover layer
26 Dimple
28 Opening
30 Line
32 Perimeter connection
34 Medium; insulating material
36 Annular region

The invention claimed is:

1. A sandwich construction element for interior walls, cabin walls, outer walls, bulkhead walls, automotive bodies, fire protection elements, fire protection walls, acoustic panels, thermal insulation panels, sun collector panels, panel heaters, panel coolers or construction panels with line guides, wherein the sandwich construction element has at least two hemisphere panels combined with each other, each hemisphere panel having uniform hemispherical elevations or elevations in the shape of a sphere segment or a sphere layer between planar regions and spaced at a distance from one another, the two or in each case two hemisphere panels face each other with their elevations, and when two or in each case two hemisphere panels are combined with each other, the elevations of a hemispherical panel respectively make contact with their apex points or apex surfaces to a planar region of the other hemisphere panel, wherein two hemisphere panels are connected to each other in that the elevations are connected in the region of their apex points or apex surfaces with the planar region of the other or another hemisphere panel to which they make contact, the elevations of the hemisphere panels combined with each other are arranged at a distance to each other, the elevations carry a dimple pointing radially outward in the region of their apex points or apex surfaces, each hemisphere panel has openings in the area of its planar regions and in the elevation array to accommodate respectively one dimple, and for two or in each case two hemisphere panels combined with each other, the dimples of one hemisphere panel engage into the opening of the respectively other hemisphere panel with a shape lock.

2. The sandwich construction element according to claim 1, wherein each hemisphere panel has the elevations in a matrix-shaped elevation array, and the elevation array of the hemisphere panels combined with each other is equivalent.

3. The sandwich construction element according to claim 1, comprising at least two hemisphere panels connected to each other on two perimeter sides, wherein the two hemisphere panels connected to each on two perimeter sides accommodate a volumetric flow of a liquid or gaseous medium from one of the remaining perimeter sides to the other remaining perimeter side.

4. The sandwich construction element according to claim 1, comprising lines embedded between two hemisphere panels facing each other and between the elevations of these hemisphere panels.

5. The sandwich construction element according to claim 1, wherein a free space between two hemisphere panels facing each other and between the elevations comprised by said hemisphere panels is filled with an insulating material.

6. The sandwich construction element according to claim 1, comprising elevations filled with an intumescent construction material.

7. The use of a sandwich construction element according to claim 1 as panel heater or panel cooler.

8. The use of a sandwich construction element according to claim 1 as sun collector.

9. A method for producing a sandwich construction element according to claim 1, wherein at least two hemisphere panels are oriented to face each other with their elevations and are combined with each other in a configuration, wherein the apex points or apex surfaces of the elevations make contact to a hemisphere panel, respectively on a planar region of the other hemisphere panel between elevations located there, wherein the at least two hemisphere panels are combined by connecting the apex points or apex surfaces of the elevations of one hemisphere panel with respectively one planar region of the other hemisphere panel between elevations located there.

10. The method according to claim 9, wherein the at least two hemisphere panels are combined by connecting the apex points or apex surfaces of the elevations of one hemisphere panel with respectively one planar region of the other hemisphere panel between elevations located there such that the elevations of the hemisphere panels combined with each other are arranged at a distance to each other.

11. The method according to claim 9, wherein the at least two hemisphere panels are combined by gluing or melting together radially outward pointing dimples originating in the region of the apex points or apex surfaces from the elevations of a hemisphere panel with respectively one opening in a planar region of the other hemisphere panel between elevations located there.

* * * * *